(12) United States Patent
Terao et al.

(10) Patent No.: US 8,250,171 B2
(45) Date of Patent: Aug. 21, 2012

(54) CONTENT DELIVERY APPARATUS, CONTENT DELIVERY METHOD, AND CONTENT DELIVERY PROGRAM

(75) Inventors: Kyoichi Terao, Tokyo (JP); Itaru Takemura, San Jose, CA (US)

(73) Assignee: Pioneer Corporation, Tokyo (JP)

( * ) Notice: Subject to any disclaimer, the term of this patent is extended or adjusted under 35 U.S.C. 154(b) by 22 days.

(21) Appl. No.: 12/666,085

(22) PCT Filed: Jun. 22, 2007

(86) PCT No.: PCT/JP2007/062603
§ 371 (c)(1),
(2), (4) Date: May 6, 2010

(87) PCT Pub. No.: WO2009/001416
PCT Pub. Date: Dec. 31, 2008

(65) Prior Publication Data
US 2010/0250674 A1    Sep. 30, 2010

(51) Int. Cl.
*G06F 15/16* (2006.01)
(52) U.S. Cl. ...................................................... 709/217
(58) Field of Classification Search .................... 709/217
See application file for complete search history.

(56) References Cited

U.S. PATENT DOCUMENTS

| | | | |
|---|---|---|---|
| 7,653,689 B1* | 1/2010 | Champagne et al. | 709/206 |
| 7,894,471 B2* | 2/2011 | Hirano et al. | 370/464 |
| 2007/0195796 A1* | 8/2007 | Ushiyama et al. | 370/396 |
| 2009/0119386 A1* | 5/2009 | Busser et al. | 709/218 |
| 2010/0191756 A1* | 7/2010 | Terao et al. | 707/758 |
| 2011/0208828 A1* | 8/2011 | Sakakihara et al. | 709/217 |

FOREIGN PATENT DOCUMENTS

| | | |
|---|---|---|
| JP | 2002-32280 | 1/2002 |
| JP | 2003-244678 | 8/2003 |
| JP | 2006-178782 | 7/2006 |
| JP | 2007-73003 | 3/2007 |

OTHER PUBLICATIONS

International Search Report for PCT/JP2007/062603, mailed Sep. 25, 2007.
Isamu Kaneko, "The technology of Winny", ASCII, Oct. 2005, (English language concise explanation of relevance only; also see Background Section of specification) 1 page.
Wikipedia entry for "Winny" http://en.wikipedia.org/wiki/Winny, 5 pages, Retrieved Apr. 2012.

* cited by examiner

*Primary Examiner* — Wing Chan
*Assistant Examiner* — Alicia Baturay
(74) *Attorney, Agent, or Firm* — Nixon & Vanderhye P.C.

(57) ABSTRACT

In a content delivery method in a P2P network, a node managing a content causes a downstream node to manage a volume of a divided content; this volume is according to a situation of the downstream node (for example, a line speed to which a node is connected). A node managing a content holds, as management information, partial information of the divided content managed by its own node, and location information indicative of a location at which a content itself is presented. Next, when a content transfer request is sent to a node managing a content, the node accesses a content holding node in accordance with the held location information, downloads a volume of a divided content indicated by the partial information, and uploads the volume of the divided content to a node that sends the content transfer request.

6 Claims, 24 Drawing Sheets

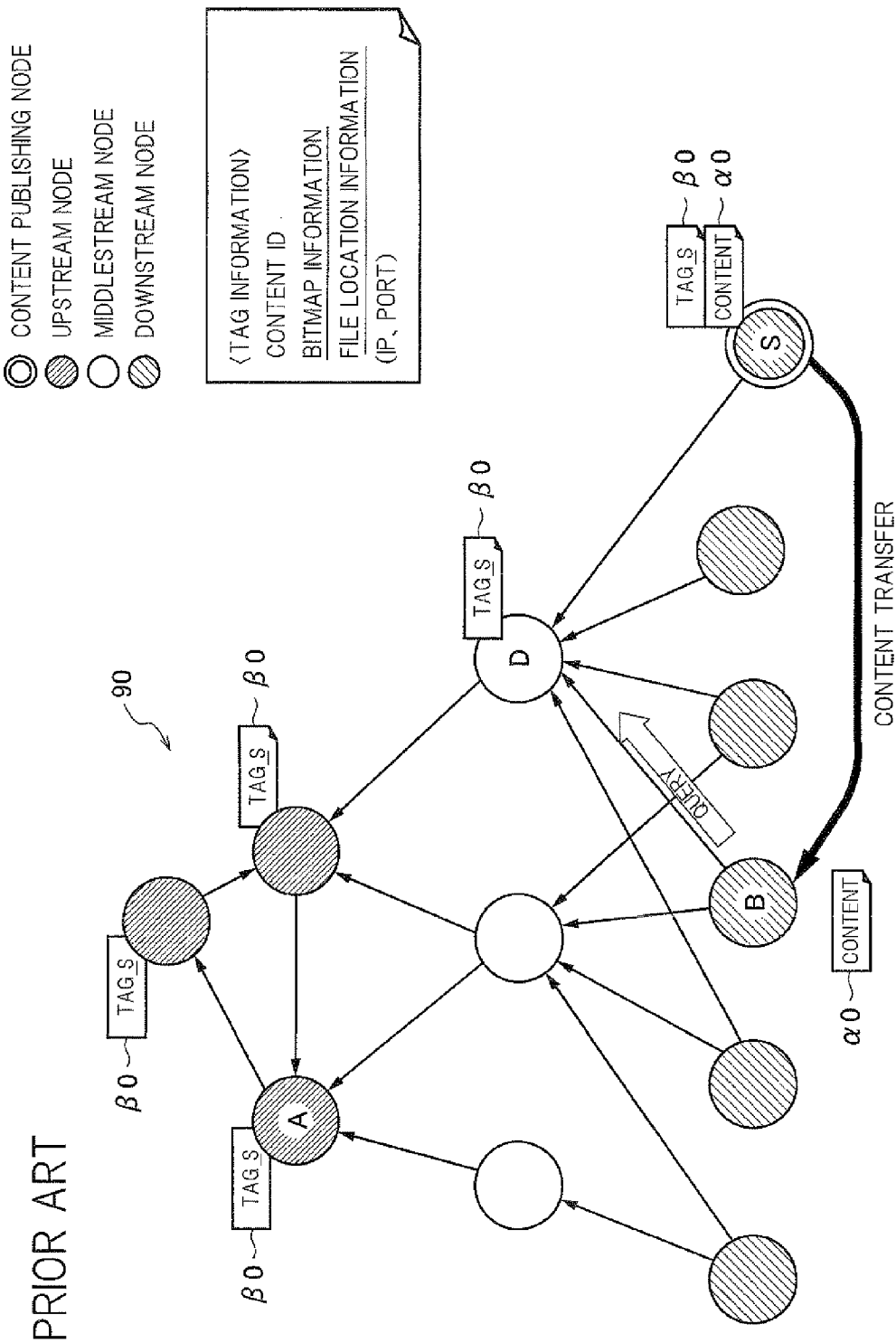

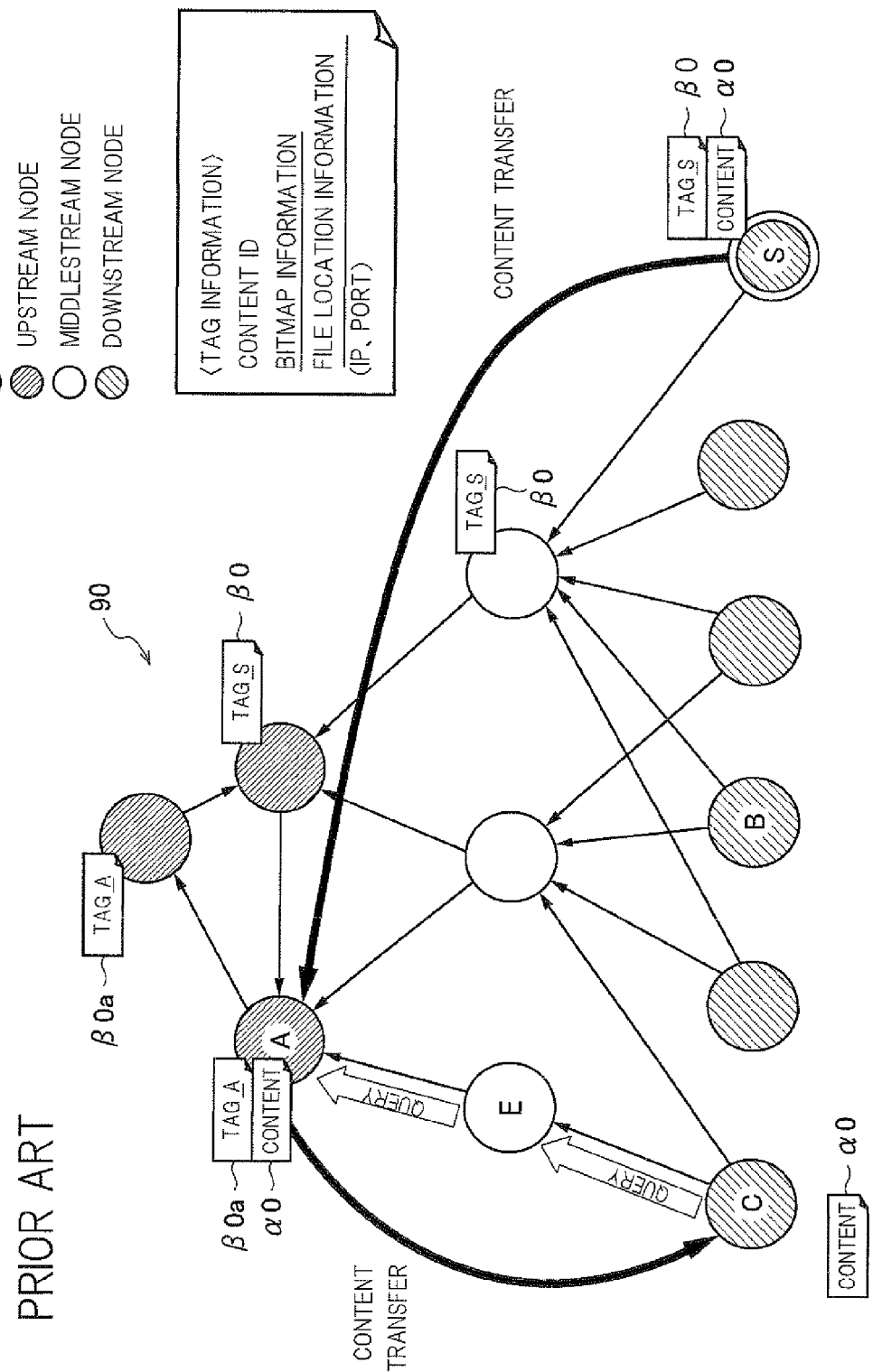
[FIG.2] PRIOR ART

[FIG.3]
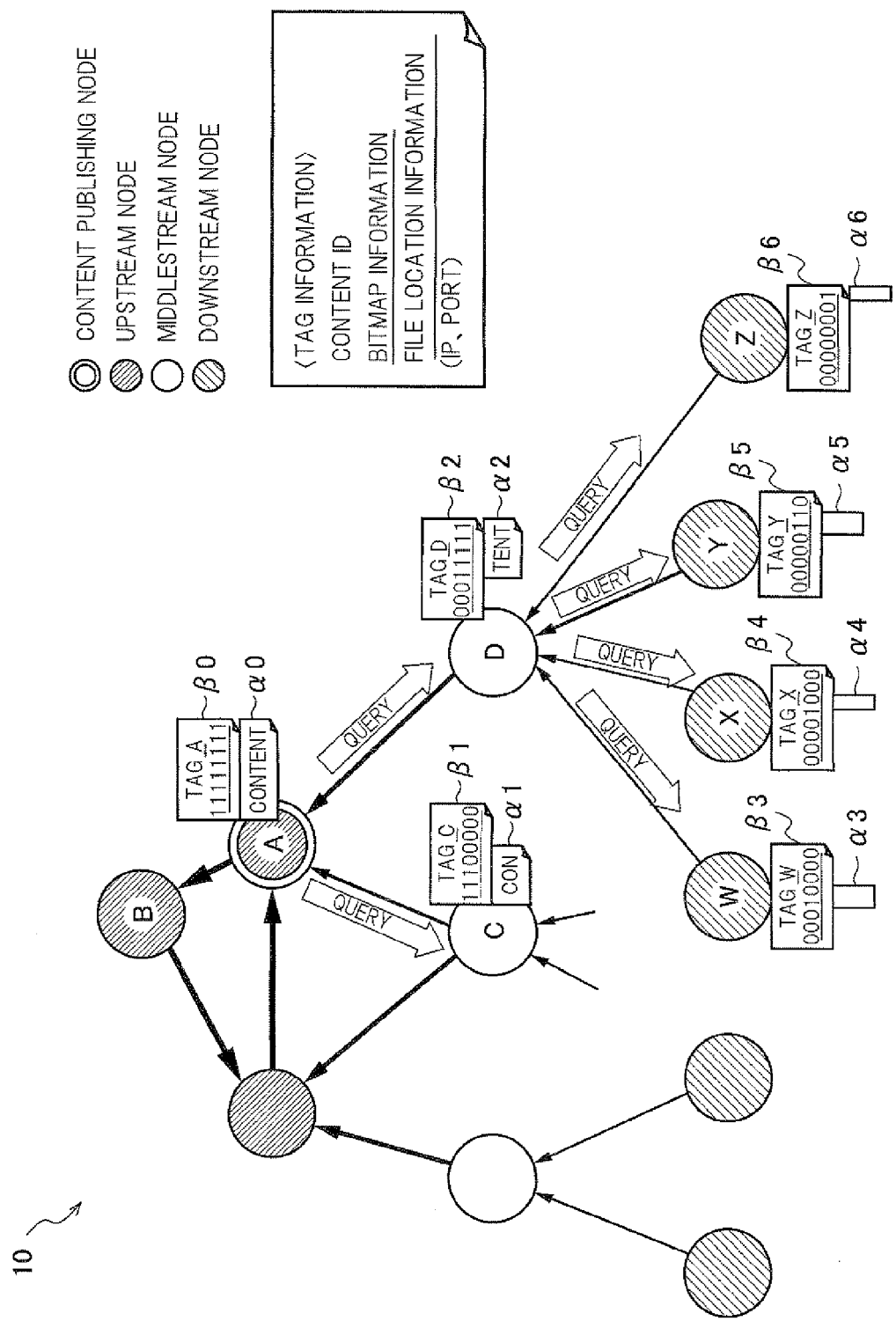

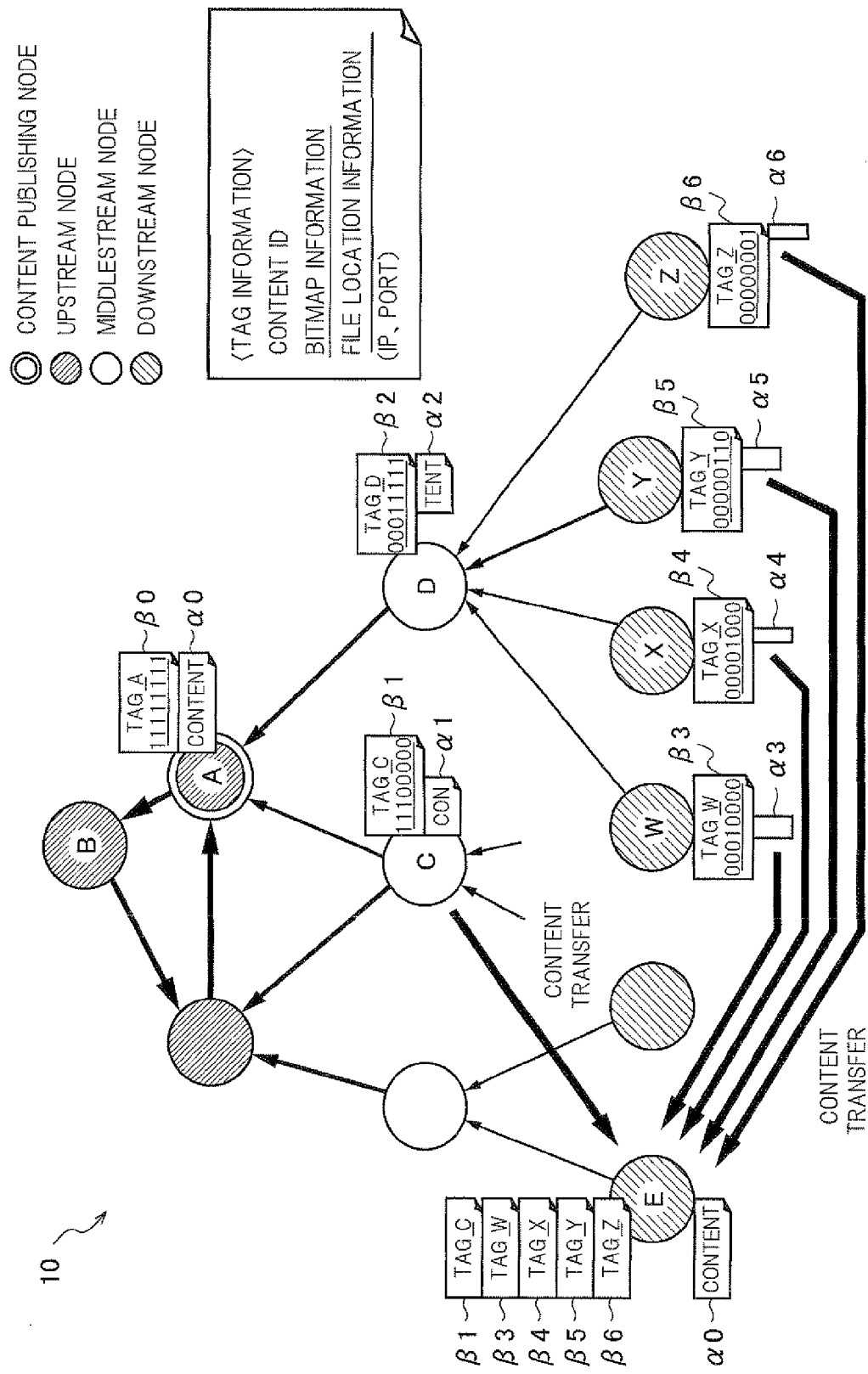
[FIG.4]

[FIG.5]
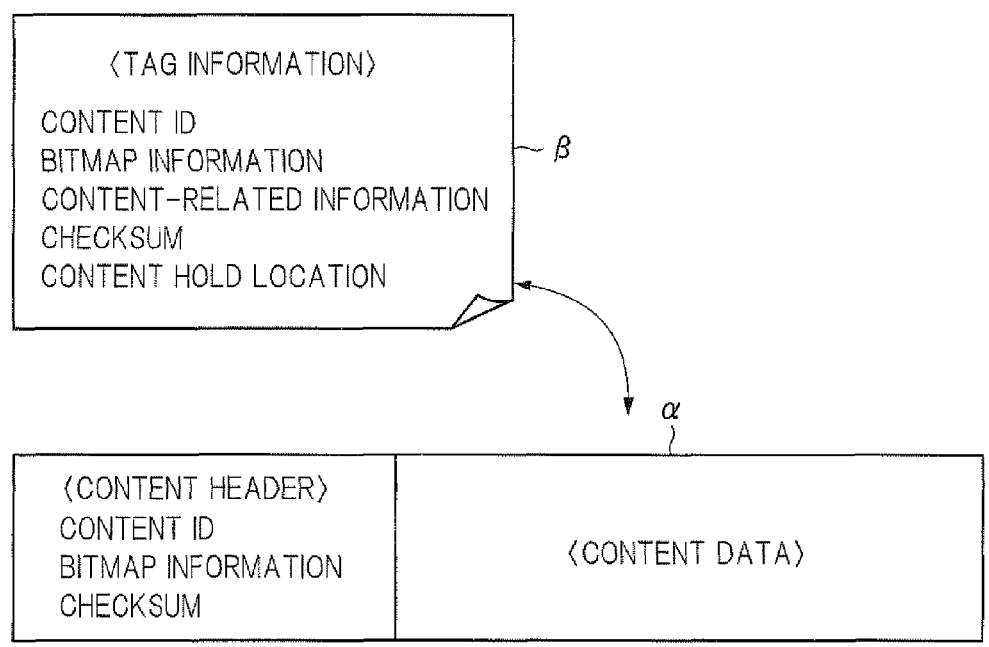
[FIG.6]
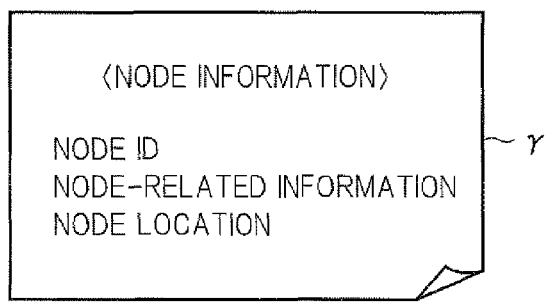

[FIG.7]
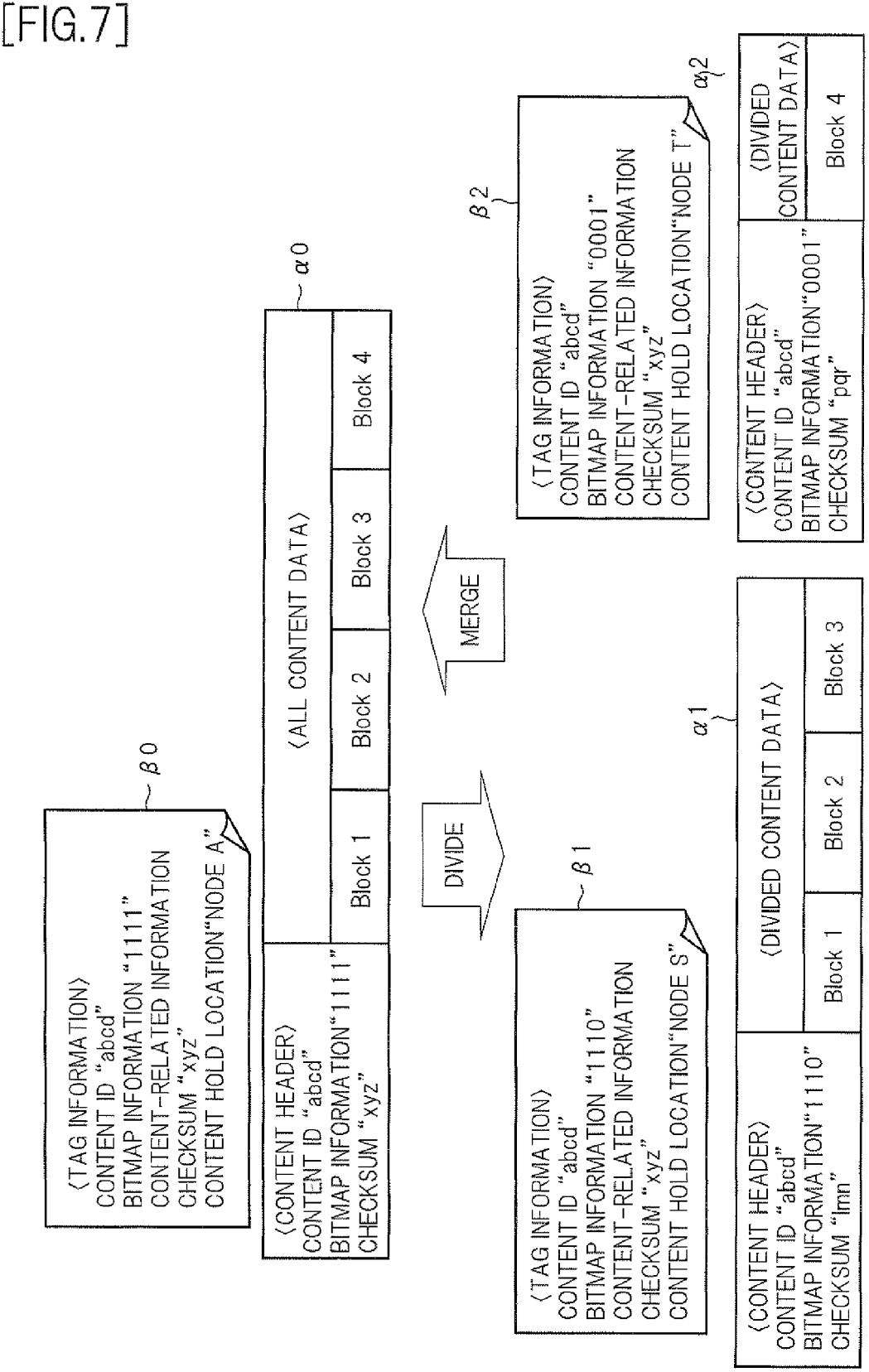

[FIG.8]
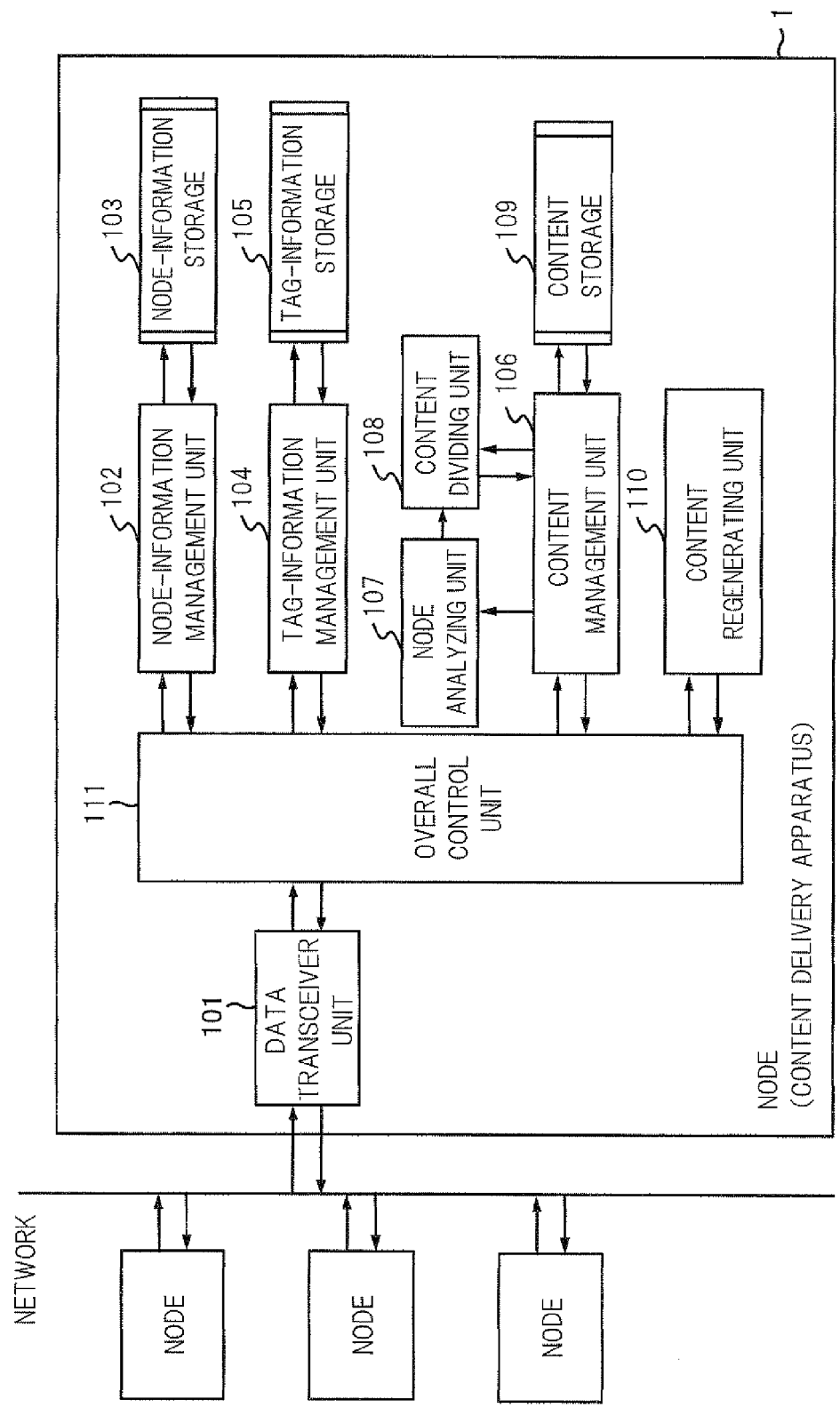

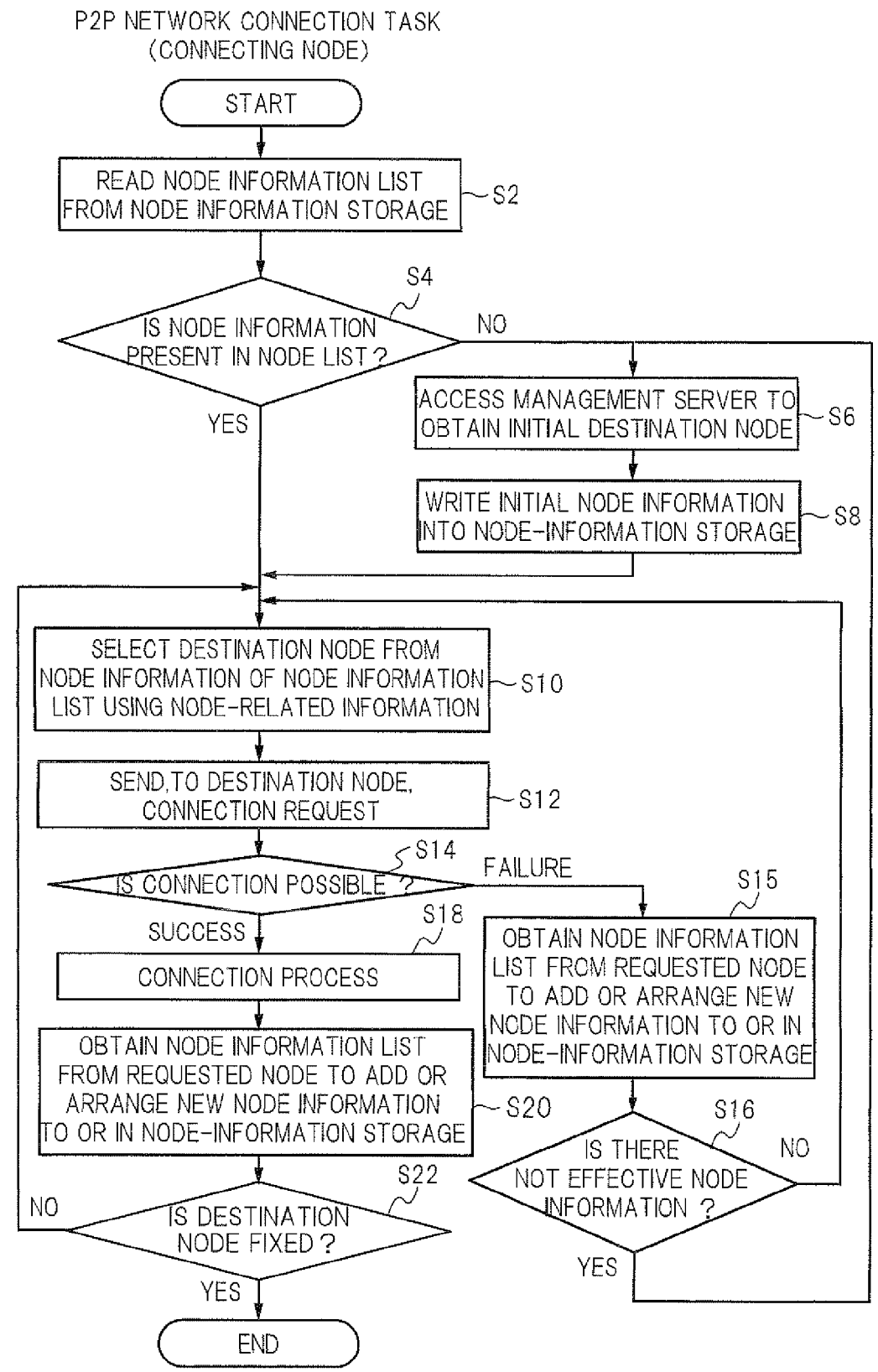

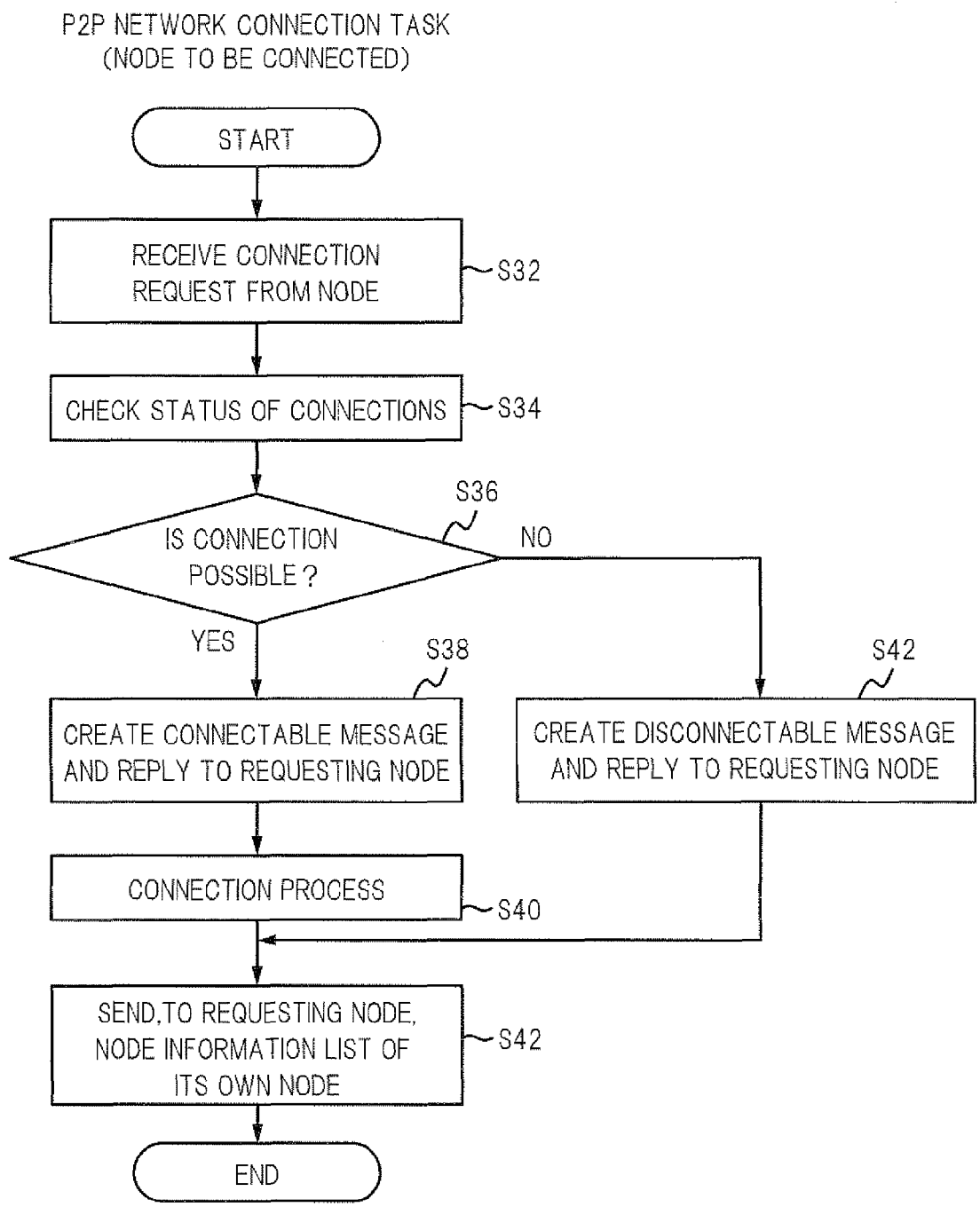

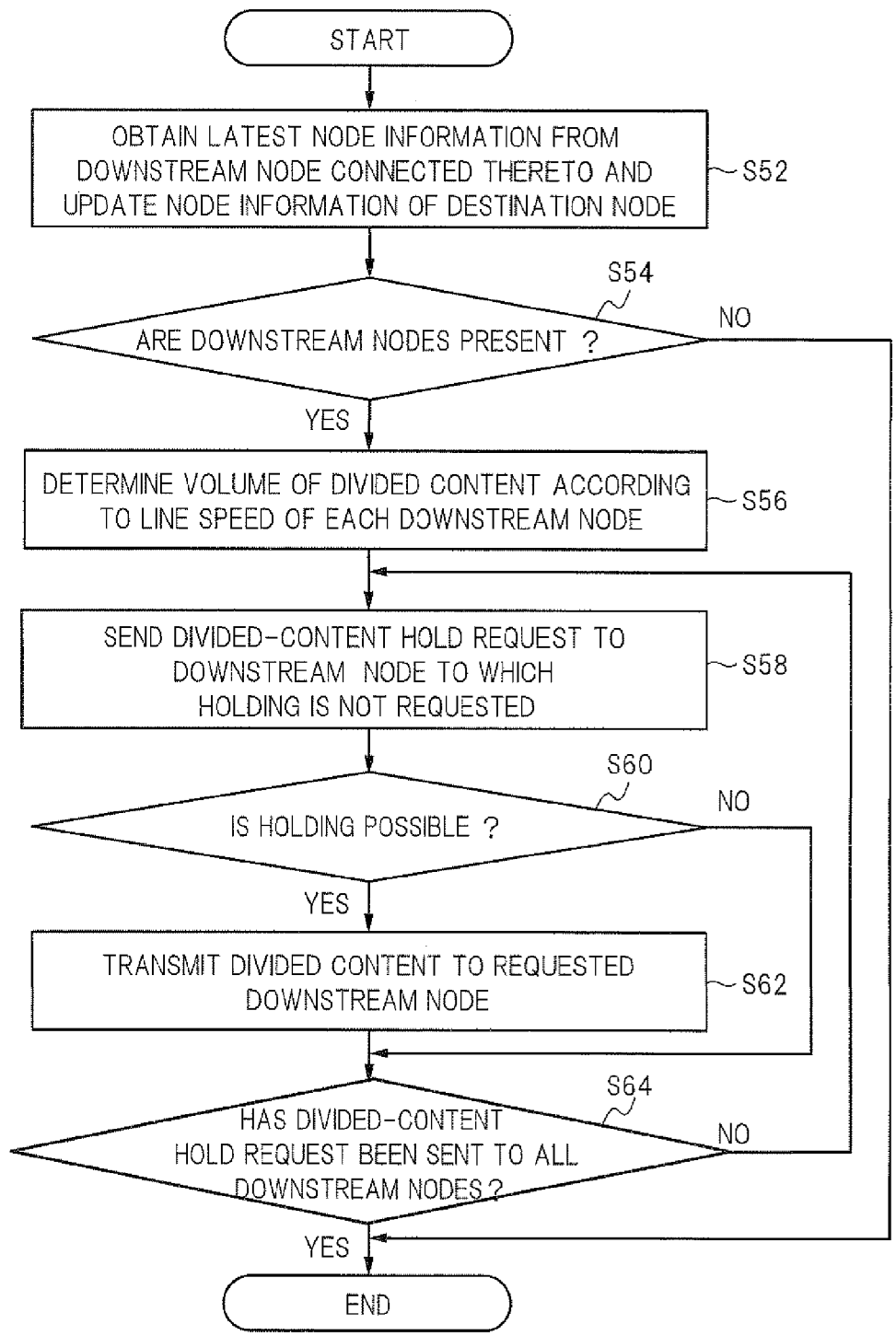

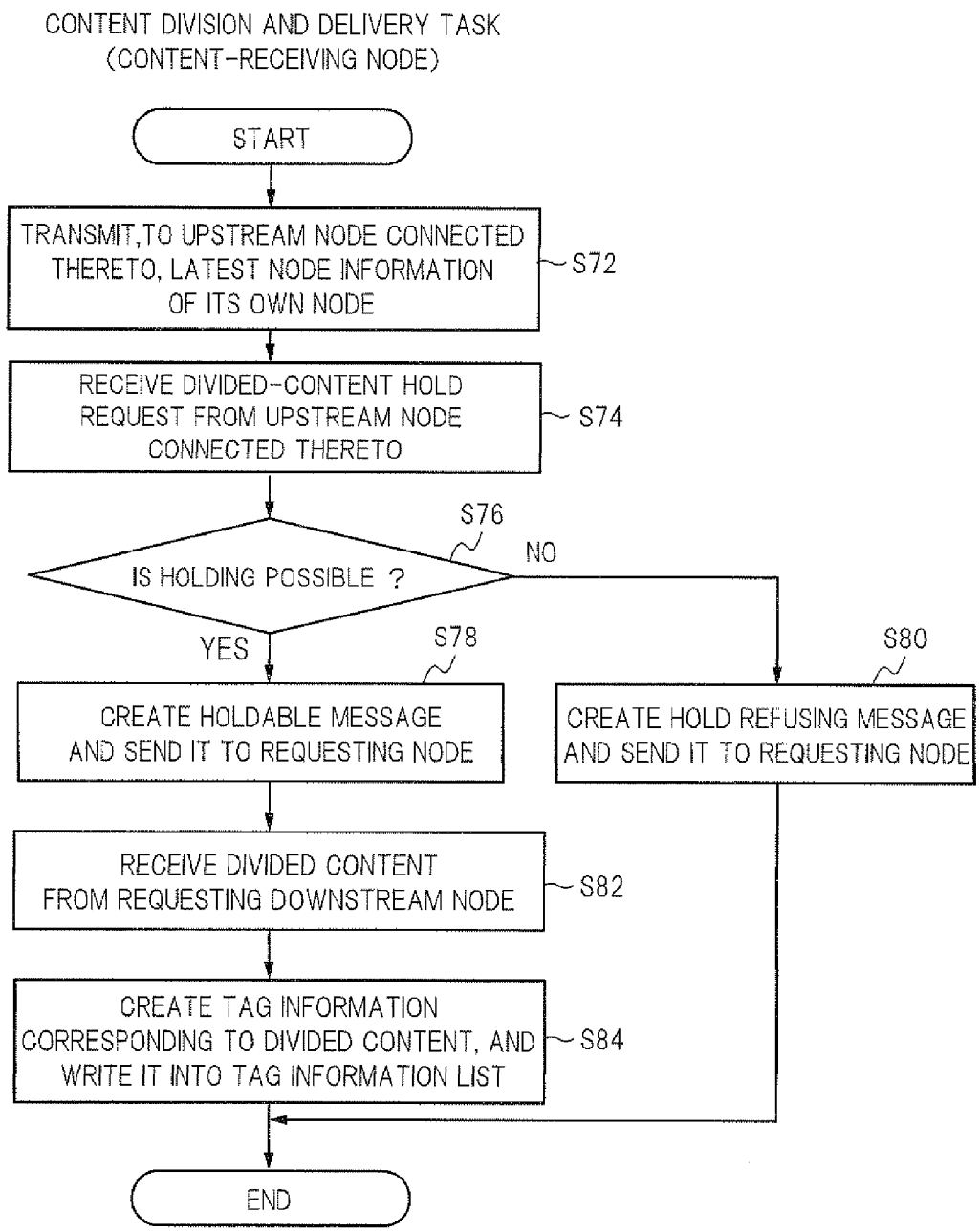

[FIG.13]
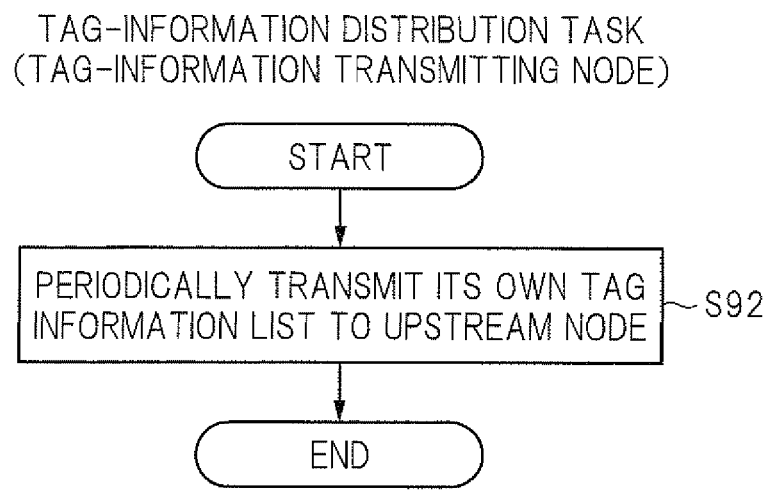
[FIG.14]
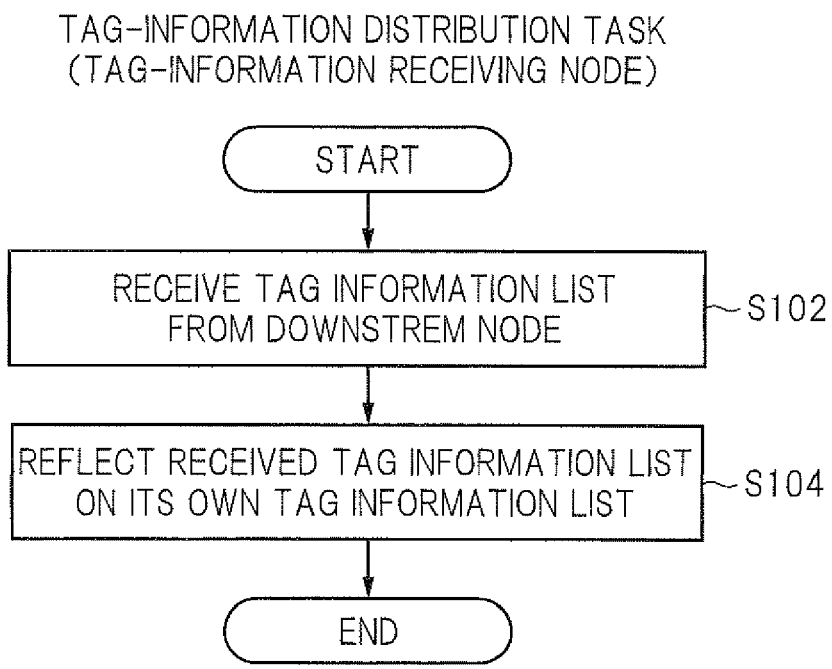

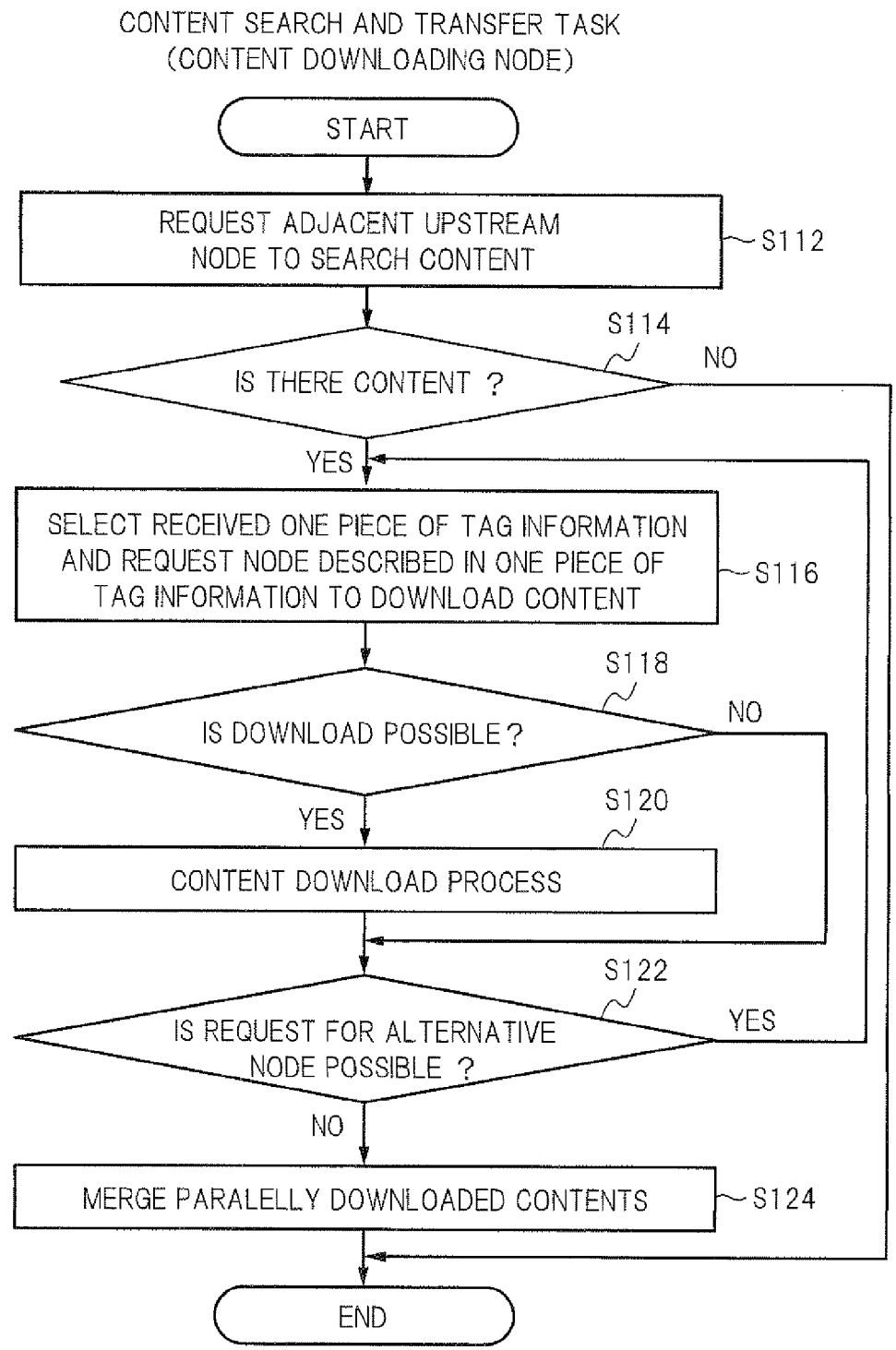
[FIG.15]

[FIG.16]
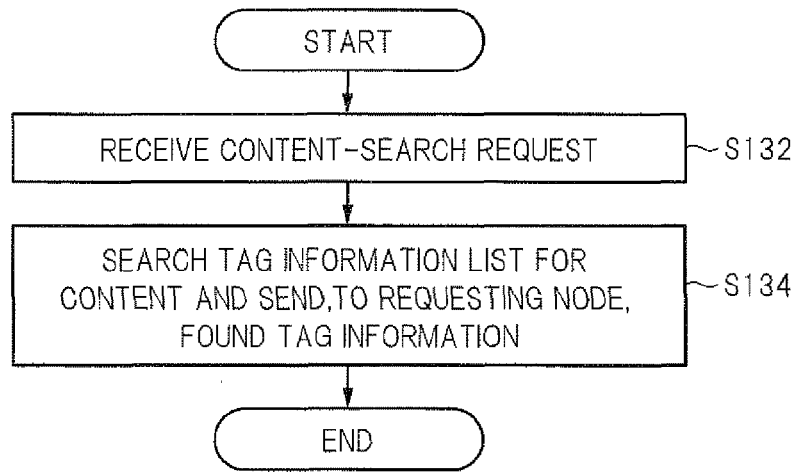
[FIG.17]
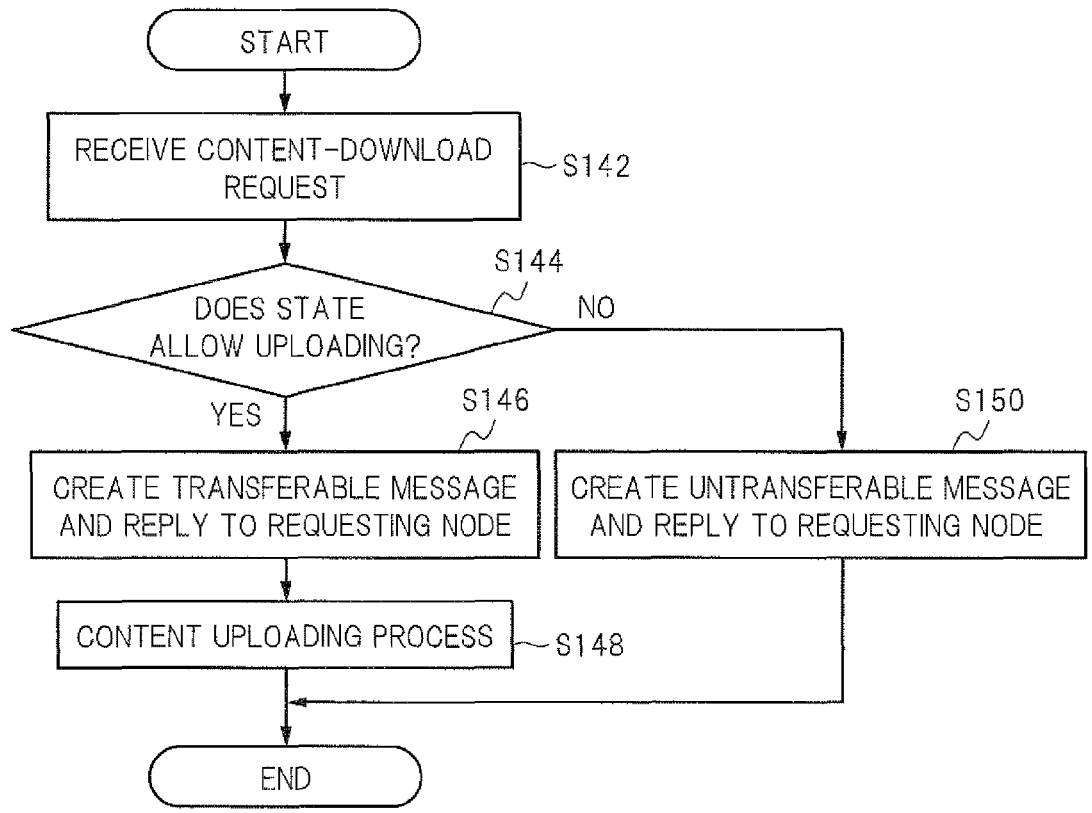

[FIG.18]
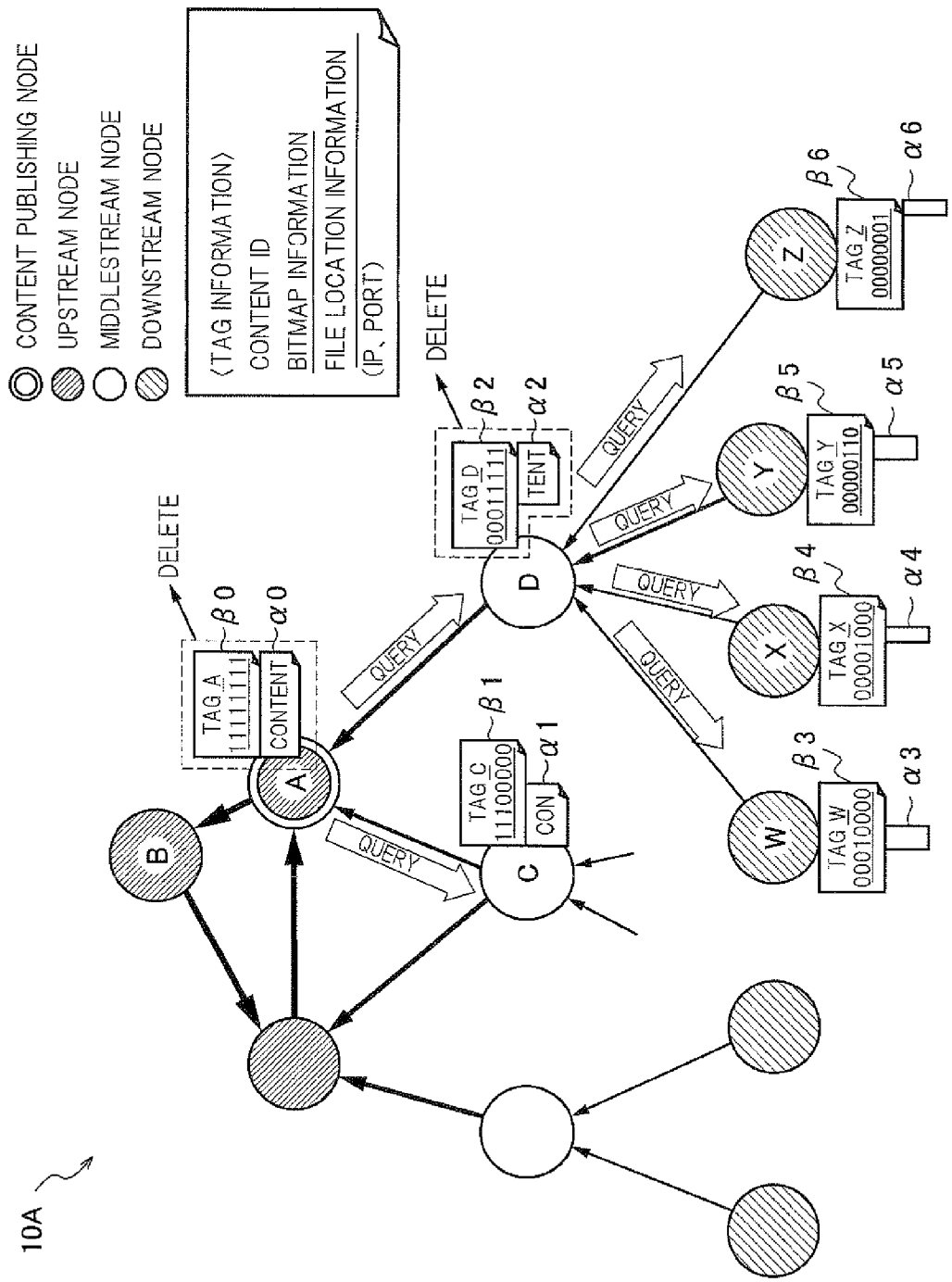

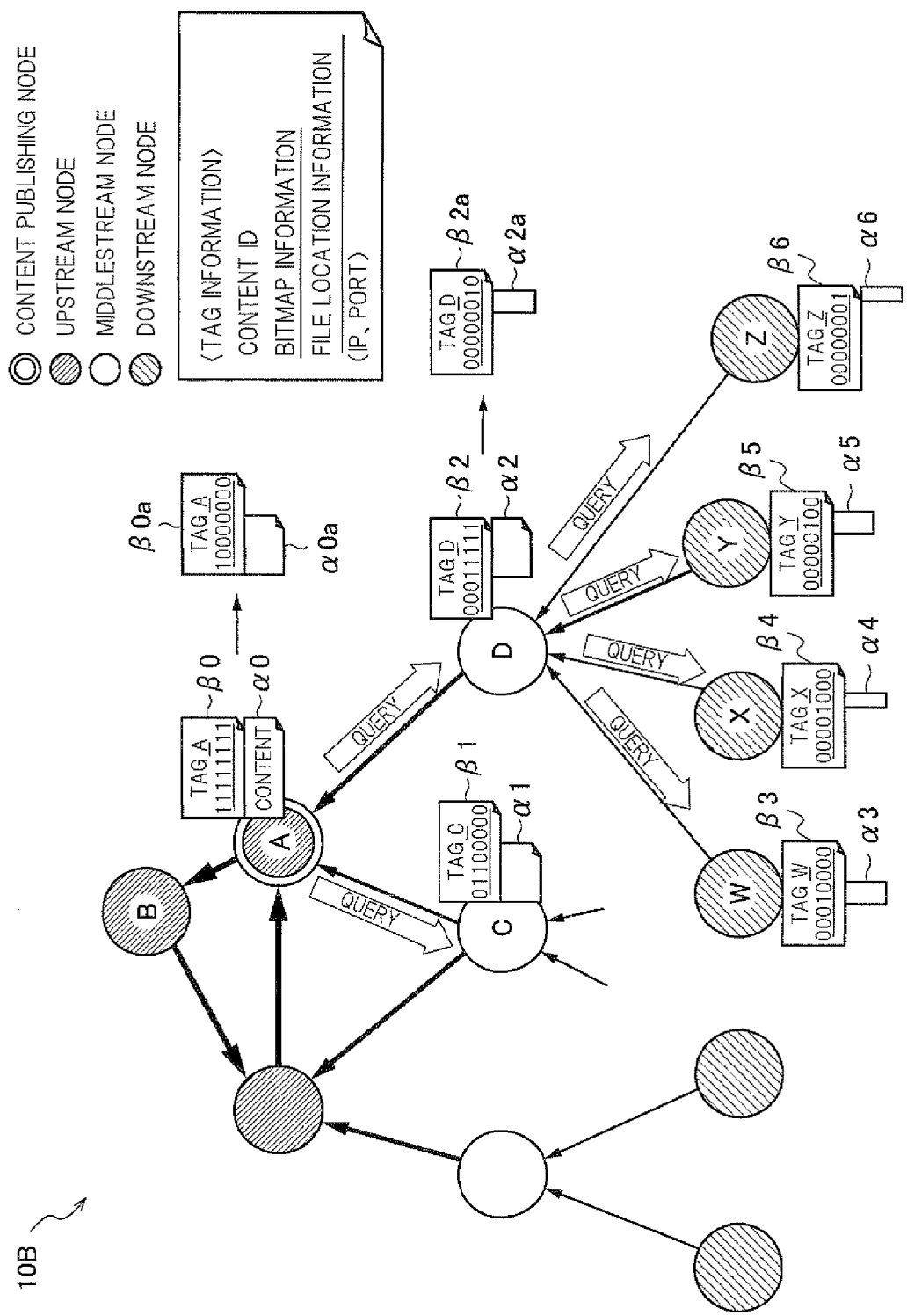
[FIG.19]

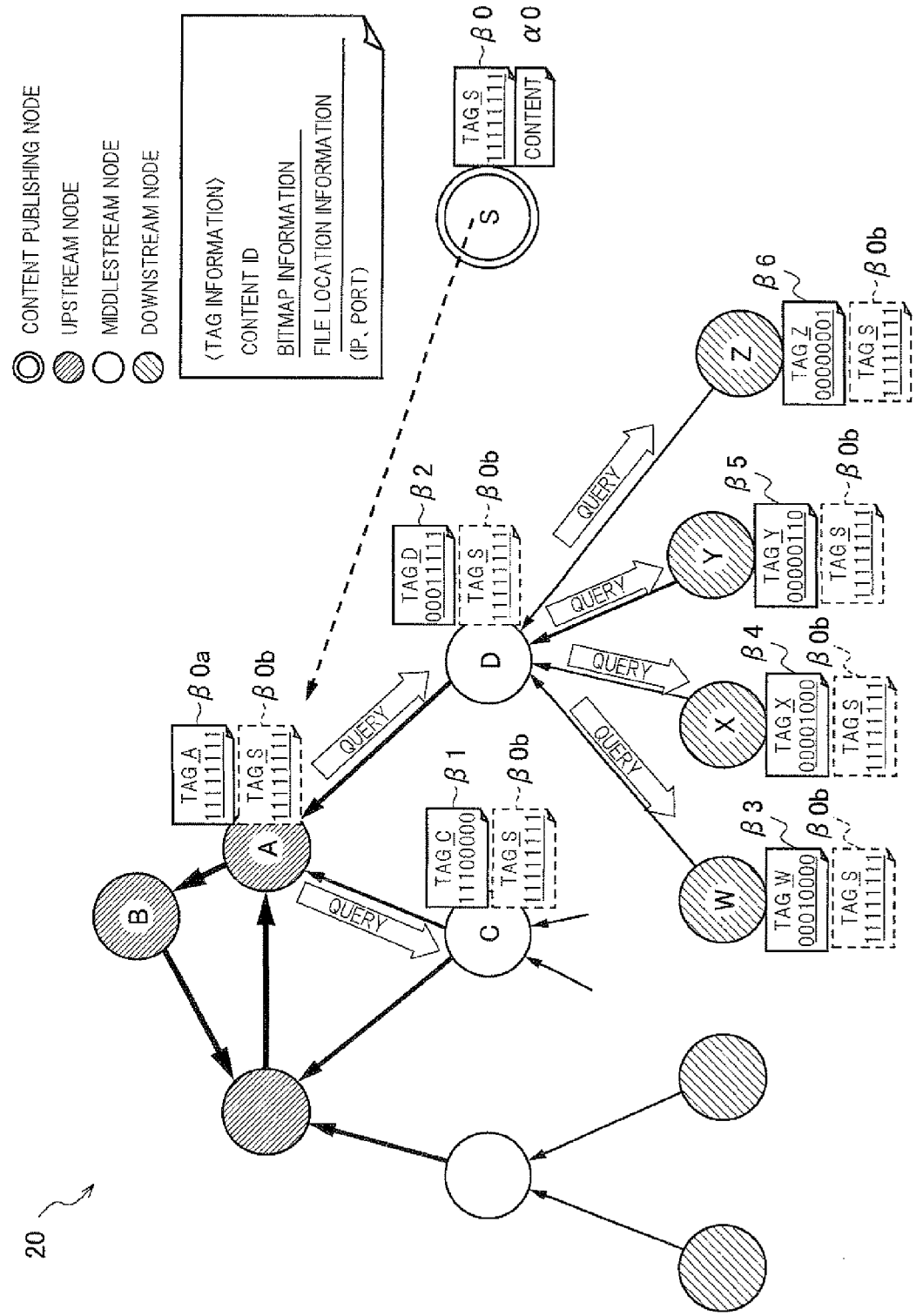

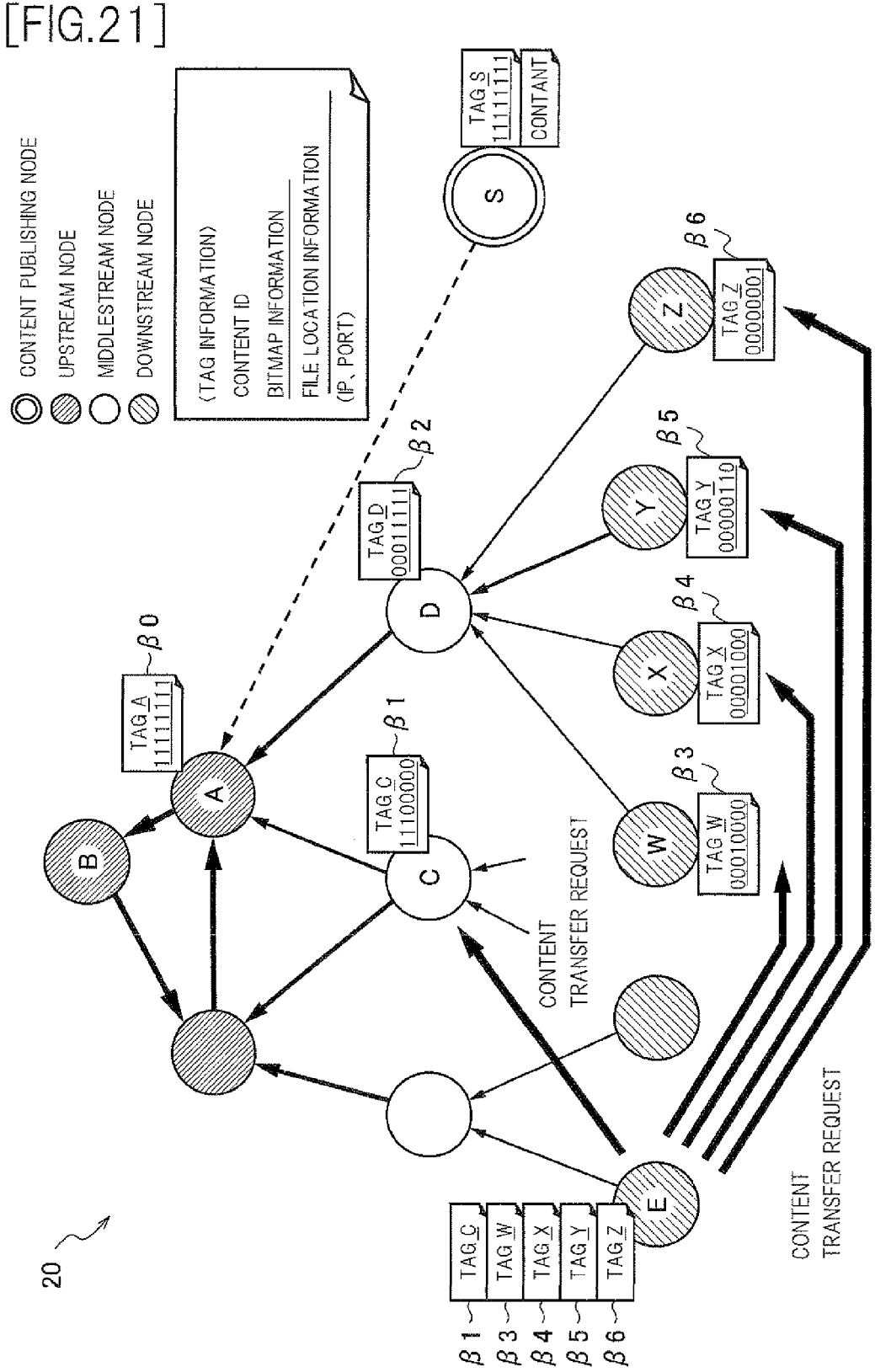
[FIG.21]

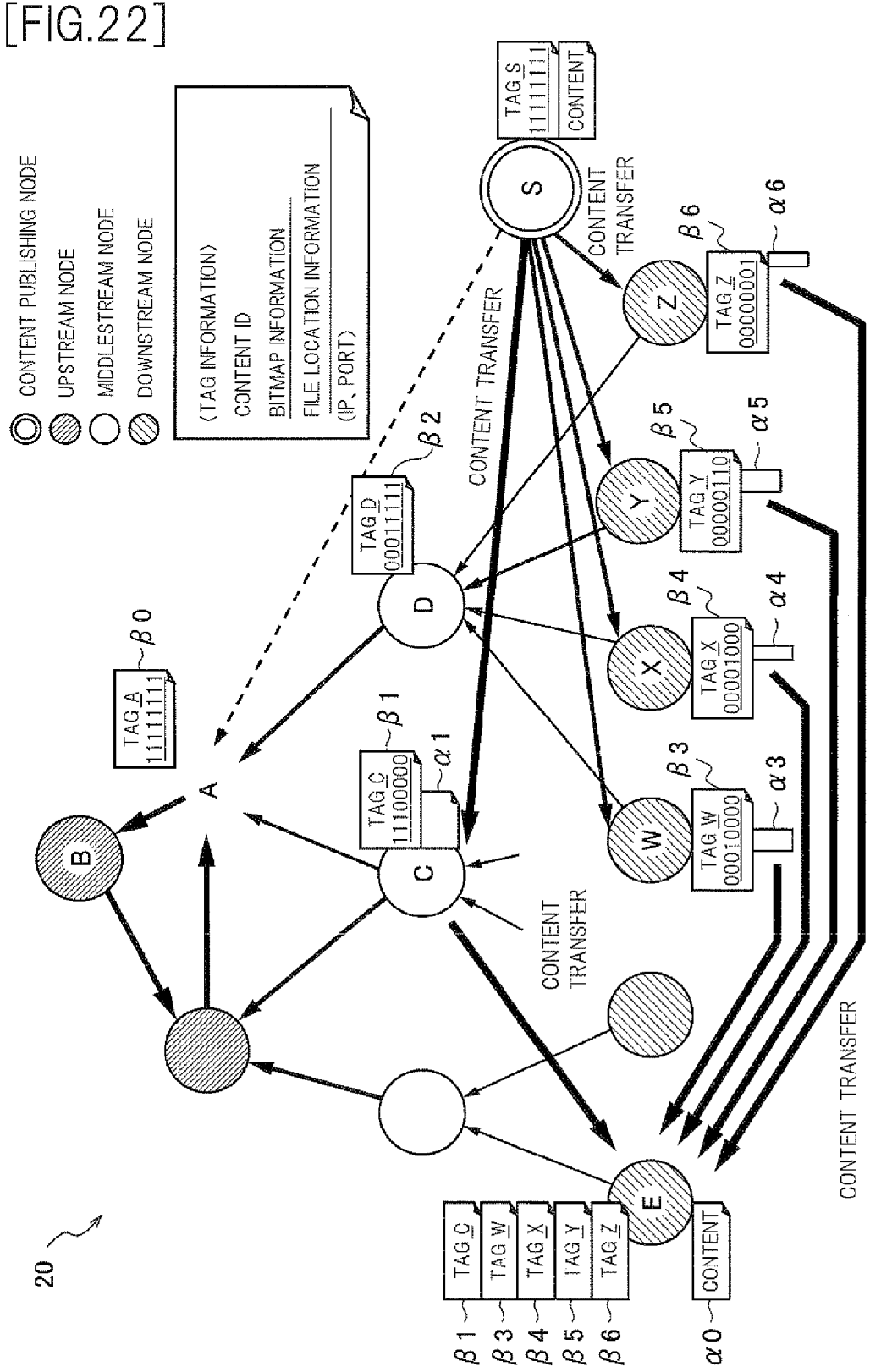
[FIG.22]

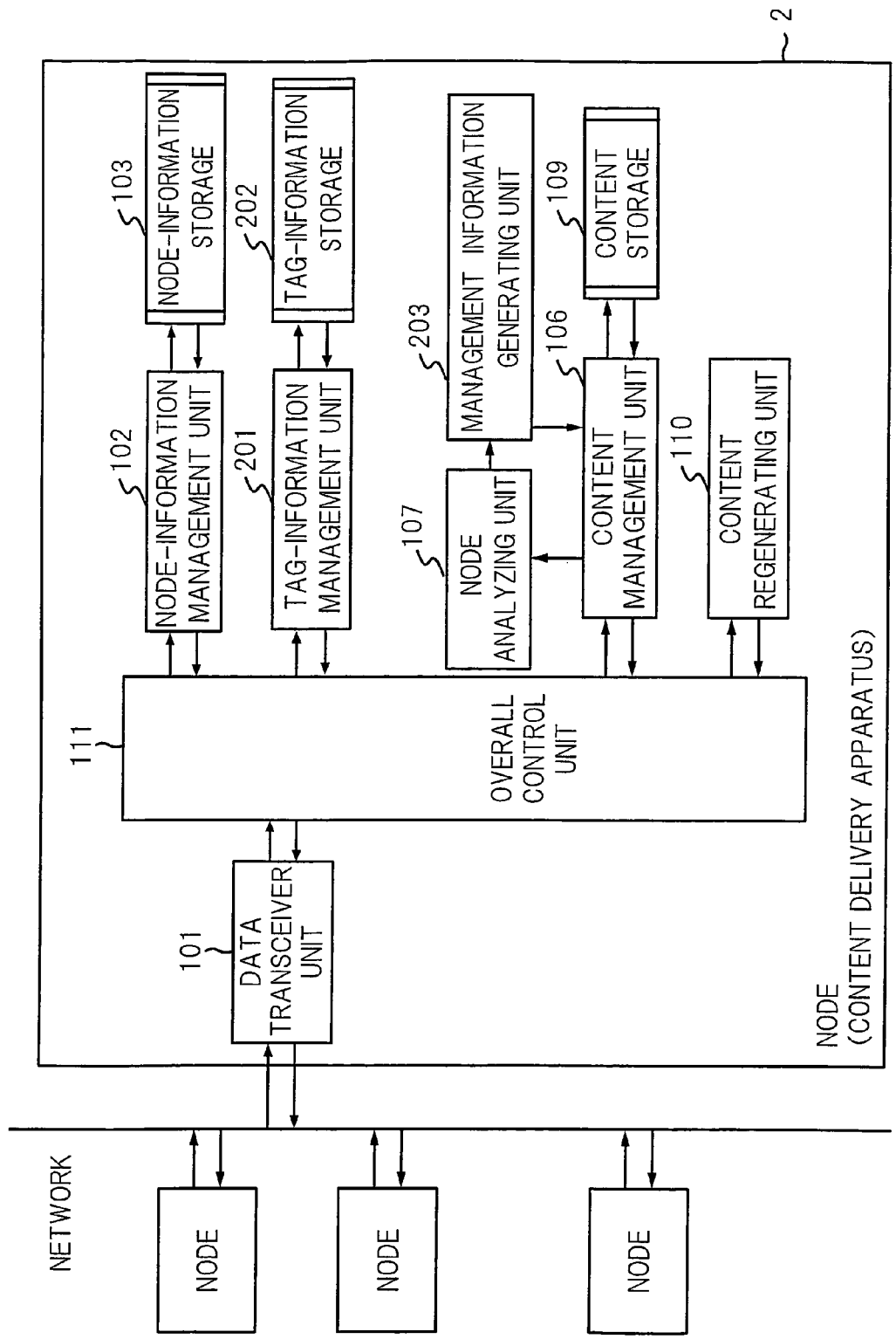
[FIG.23]

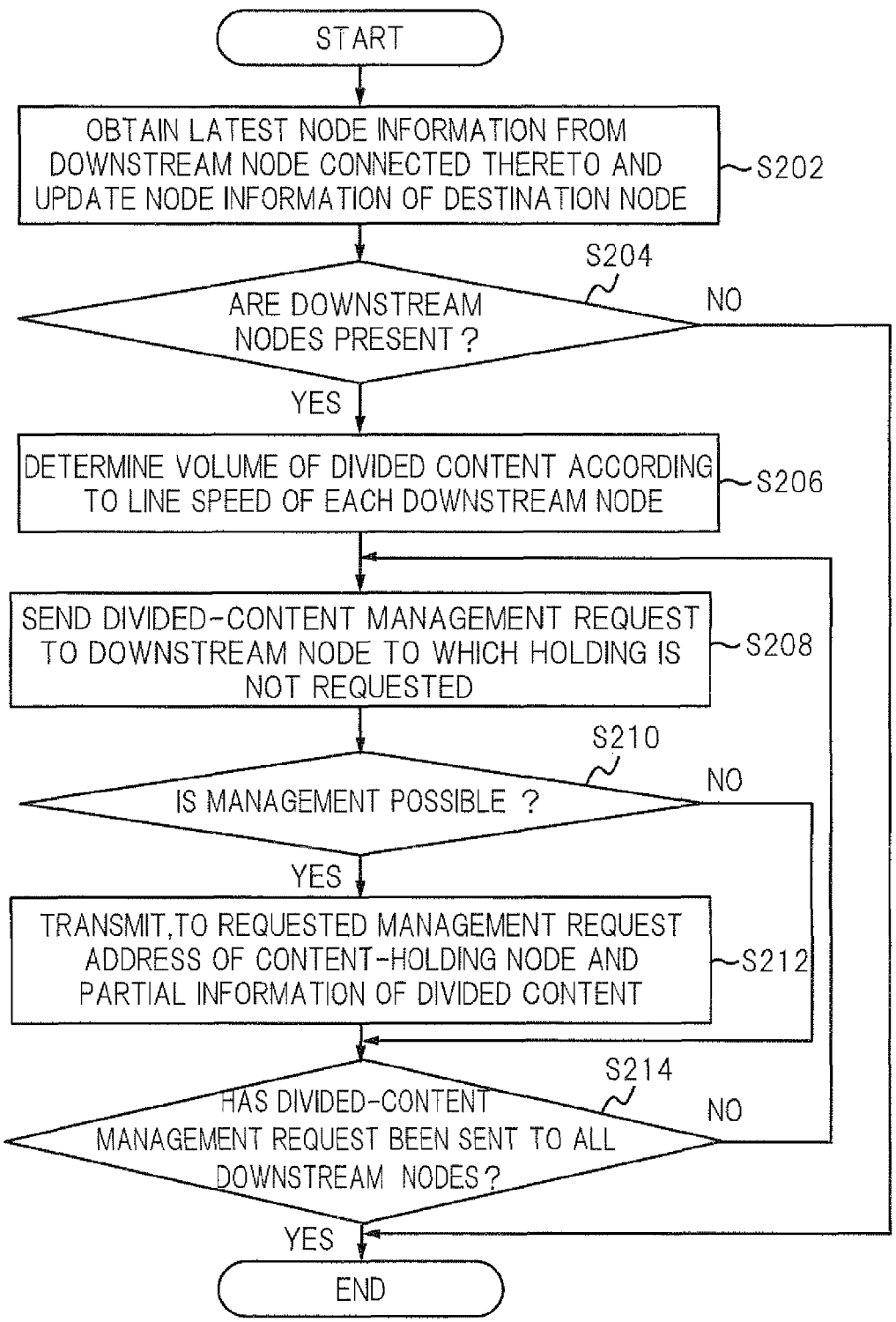

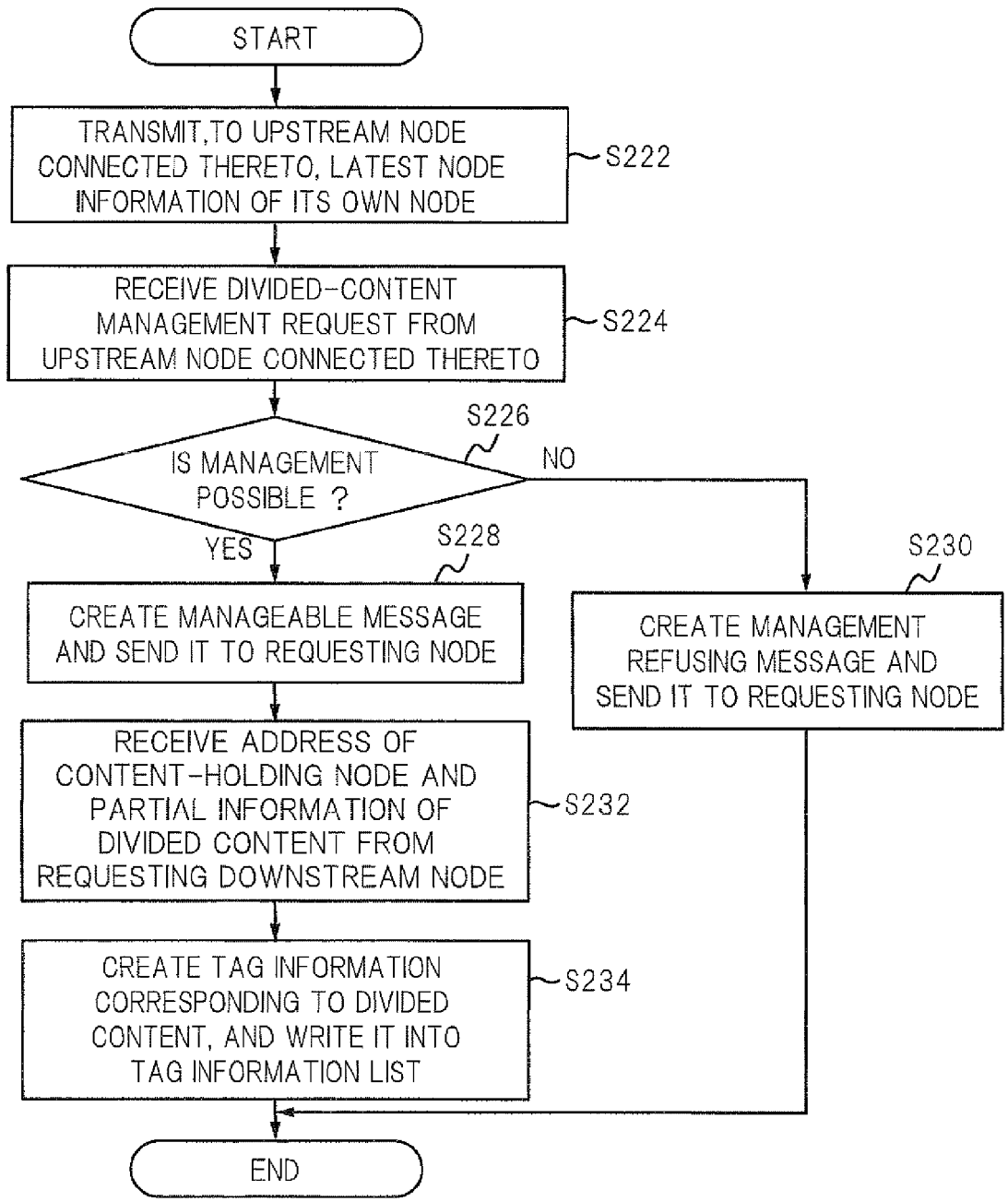

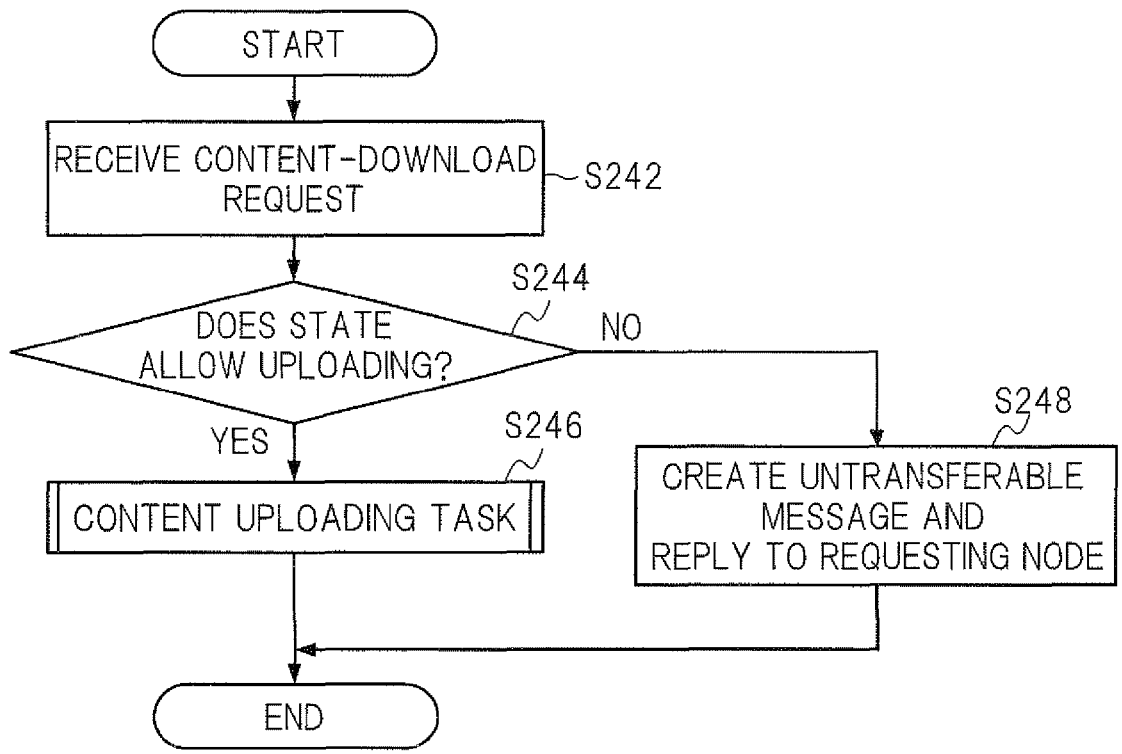

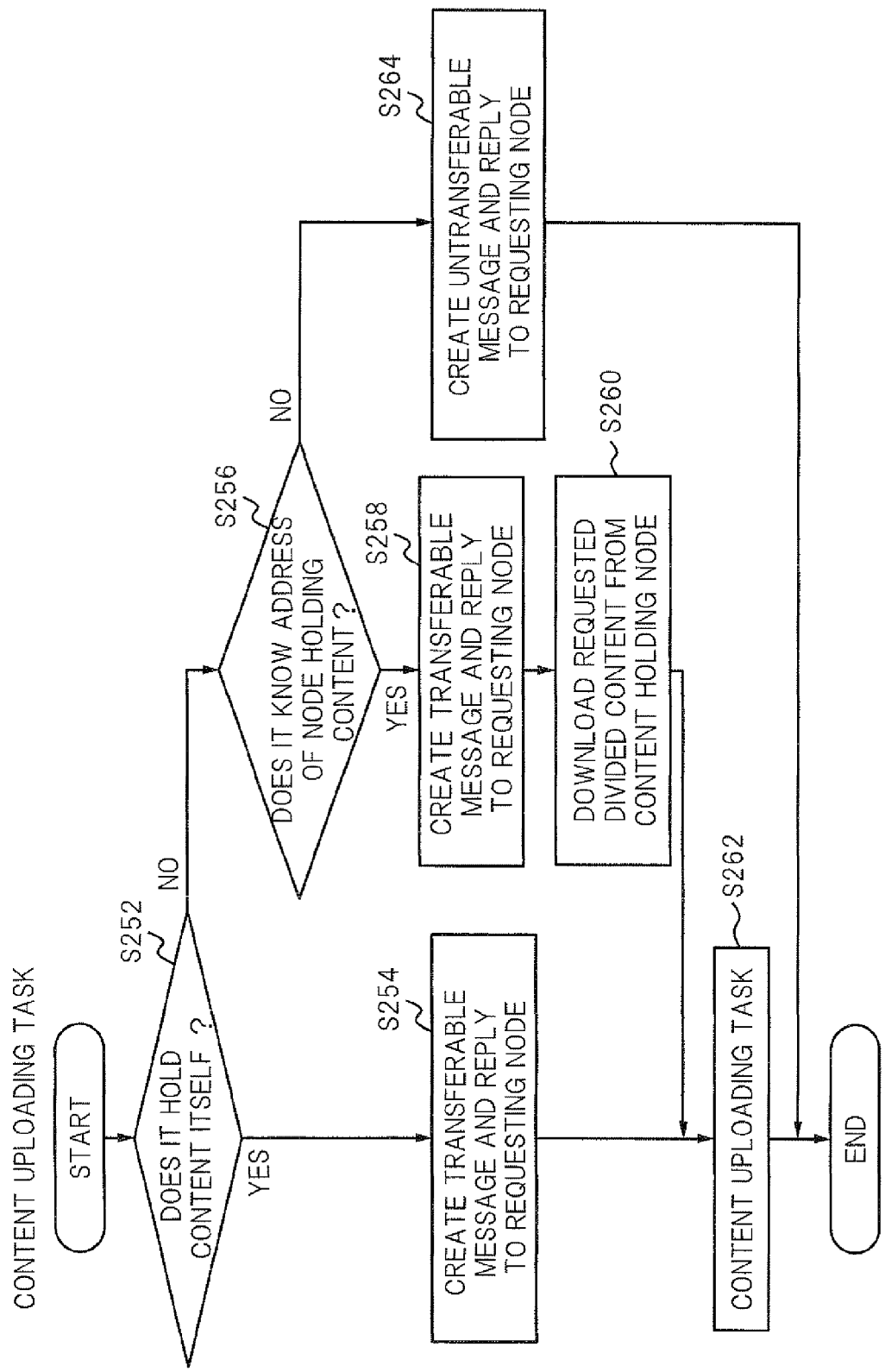
[FIG.27]

CONTENT DELIVERY APPARATUS, CONTENT DELIVERY METHOD, AND CONTENT DELIVERY PROGRAM

This application is the U.S. national phase of International Application No. PCT/JP2007/062603 filed 22 Jun. 2007, which designated the U.S. and the entire contents of which is hereby incorporated by reference.

TECHNICAL FIELD OF THE INVENTION

The present invention relates to technologies for delivering contents in P2P Peer to Peer) networks, more particularly to content delivery apparatuses, content delivery methods, and content delivery programs in such P2P networks.

BACKGROUND ART

As data delivery configurations via communication networks, configurations referred to as "P2P" have been recently widespread. In conventional content deliveries, users download files from servers managed by their carriers or the like. However, in P2P content distributions, no servers that collectively store therein digital contents are provided, and users can exchange their digital contents stored on their personal computers therebetween.

FIG. 1 illustrates a P2P network 90 that includes some nodes (computers), ranked as upstream nodes, connected to high communication networks and alternative some nodes (computers), ranked as downstream nodes, connected to low communication networks. The P2P network 90 is configured such that contents and their index information are more gathered more in the upstream nodes to thereby enhance the content-search efficiency or the content-delivery efficiency (FIG. 1 is a schematic view, and many layered networks may be provided downstream of the downstream nodes or upstream of the upstream nodes, or a two-layered network of upstream and downstream may be provided).

In the P2P network 90 illustrated in FIG. 1, when a node for retrieving a content gives a query command to an upstream node adjacent thereto, the upstream node is adapted to search its managed content list for the requested content; this content list includes collected index (information on contents). The upstream node is adapted to give, to downstream nodes, the locations of nodes, as an answer; these nodes disclose the requested content. When the requested content is not included in its managed content list, the upstream node gives the query command to a higher upstream node or a coordinate upstream node.

When receiving a result of the search from the upstream node, the downstream node connects to a node described in the answer to download the content.

For example, P2P file sharing software of Winny that forms the P2P network 90 generates tag information associated with contents in order to distribute the contents; this tag information for a content describes the location of a node storing the content (IP address, port number; hereinafter referred to as file location information). The Winny distributes the tag information to upstream nodes adjacent thereto.

When receiving the tag information, an upstream node distributes the tag information to a higher upstream node or a coordinate upstream node. This allows many pieces of tag information to be collected upstream, so that upstream nodes are adapted to manage the tag information lists, that is, the content lists.

In the P2P network 90 formed by the Winny, many pieces of tag information are more stored in the upstream nodes.

In addition, in the Winny, during the distribution of tag information, the tag information (file location information) is updated with a fixed probability. For this reason, when receiving the updated tag information and trying to download a content, a node provides a download request to an upstream node described in the updated tag information. However, because the upstream node does not actually store the content, the upstream node searches its content list, downloads the content from a node that actually stores the content, and uploads the content to the download-request providing node.

This results in that the queried content is downloaded to the source node of query, and the content is also stored in the upstream node that relays the distribution of the content. In the P2P network 90 formed by the Winny, upstream nodes serve as relay nodes of content distributions, and, therefore, store many published contents (nodes that have downloaded contents serve as content-publishing nodes).

These will be specifically described with reference to FIGS. 1 and 2.

FIG. 1 illustrates a situation in which a node S has opened a content $\alpha 0$, and a node B tries to download the content $\alpha 0$. As illustrated in FIG. 1, tag information $\beta 0$ on the content $\alpha 0$ indicative of the node S holding the content $\alpha 0$ is distributed to upstream nodes located more upstream relative to the node S.

First, the node B transmits a query for the content $\alpha 0$ to an upstream node D adjacent thereto. When receiving the query for the content $\alpha 0$, the node D returns the tag information $\beta 0$ to the node B because it holds, in its content list, the tag information $\beta 0$ indicative of the location of the content $\alpha 0$.

This results in that the node B finds the location of the node S that has published the content $\alpha 0$ from the received tag information $\beta 0$, directly establishes a P2P connection to the node S, and downloads the content $\alpha 0$.

Moreover, FIG. 2 illustrates a situation in which a node S has opened content $\alpha 0$, and a node C tries to download the contents $\alpha 0$. As illustrated in FIG. 2, the tag information $\beta 0$ on the content $\alpha 0$ indicative of the node S holding the content $\alpha 0$ is distributed to upstream nodes located more upstream relative to the node S. In addition, the tag information $\beta 0$ is updated in an upstream node so that the tag information $\beta 0$ is changed to tag information $130a$ indicative of a node A holding the content $\alpha 0$.

First, the node C transmits a query for the content $\alpha 0$ to an upstream node E adjacent thereto. When receiving the query for the content $\alpha 0$, the node E queries the node A located adjacently upstream relative thereto because it holds, in its content list, no tag information indicative of the location of the content $\alpha 0$.

Because holding, in its content list, the tag information $30a$ indicative of the location of the content $\alpha 0$, the content A returns the tag information $\beta 0$ to the node C via the node E.

This results in that the node C finds the location of the node A that has published the content $\alpha 0$ from the received tag information $\beta 0a$, directly establishes a P2P connection to the node S, and requests it to download the content $\alpha 0$. However, because the node A does not actually hold the content $\alpha 0$, it downloads the content $\alpha 0$ from the node S that actually holds the content $\alpha 0$, and uploads the content $\alpha 0$ to the node C. As a result, the content $\alpha 0$ is transferred to be located in both the node C and the node A, making it possible to improve the efficiency of distributions of contents.

First patent document: Japanese Patent Laid-Open No. 2006-178782

Non-patent document: *The technology of Winny*, Isamu Kaneko, ASCII, October, 2005

DISCLOSURE OF THE INVENTION

Problems to be Solved by the Invention

In the aforementioned P2P network 90, many contents and many pieces of tag information are more gathered in the upstream nodes. This may place a great burden of managing the contents on the upstream nodes. Of course, the P2P network 90 is a network to collect contents and their index information to more upstream nodes to thereby enhance the content-search efficiency or the content-delivery efficiency. If the downstream nodes could have an appropriate burden, it would be possible to make the entire P2P network more efficient.

The present invention has been made in view of the aforementioned circumstances, and has an example of a purpose of providing content delivery apparatuses, content delivery methods, and content delivery program in a P2P network in which:
  nodes are defined as upstream and downstream nodes according to speeds of lines connected thereto; and
  node-to-node content deliveries are carried out using tag information indicative of information on files of contents or the locations of the contents;
  these apparatuses, methods, and programs are capable of reducing a burden on the upstream node to thereby make the entire P2P network more efficient.

Means for Solving the Problems

In order to achieve such a purpose provided above, a content delivery apparatus recited in claim 1 is a content delivery apparatus constituting each node of a P2P network, the P2P network that:
  distributes tag information including information of a content, a location of a node that holds the content, and partial information indicative of which parts of the content is held;
  searches the tag information to find a desired content; and deliveries contents among the nodes,
  a management of a node at least holding management information, the management information including:
  location information indicative of a location at which a delivery target content is presented; and
  a partial information of the delivery target content, the content delivery apparatus comprising:
  an adjacent node situation obtaining means that obtains information of a situation of a node adjacent to its own node;
  a content volume determining means that determines, from the delivery target content managed by its own node, a volume of a part of a content that the adjacent node is requested to manage;
  a content management request means that requests the adjacent node to manage the part of the content determined by the content volume determining means;
  a management information sending means that, when receiving a replay, from the adjacent node, representing management being possible, sends, to the adjacent node, the management information including the partial information based on the volume determined by the content volume determining means;
  a tag information distributing means that creates the tag information based on the part of the delivery target content managed by its own node, and sends the created tag information to another node;
  a content transfer request receiving means that receives a download request for the delivery target content; and
  a content transfer means that:
  when the download request received by the content transfer request receiving means corresponds to the delivery target content managed by its own node, accesses, in accordance with the location information, a node holding the delivery target content;
  downloads, in accordance with the partial information, the corresponding part of the delivery target content to its own node; and
  uploads the corresponding part of the delivery target content to a node that sends the download request of the delivery target content.

A content delivery method recited in claim 6 is a content delivery method in a P2P network, the P2P network that:
  distributes tag information including information of a content, a location of a node that holds the content, and partial information indicative of which parts of the content is held;
  searches the tag information to find a desired content; and deliveries contents among the nodes,
  a management of a node at least holding management information, the management information including:
  location information indicative of a location at which a delivery target content is presented; and
  a partial information of the delivery target content,
  a node of the P2P network comprising:
  an adjacent node situation obtaining step that obtains information of a situation of a node adjacent to its own node;
  a content volume determining step that determines, from the delivery target content managed by its own node, a volume of a part of a content that the adjacent node is requested to manage;
  a content management request step that requests the adjacent node to manage the part of the content determined by the content volume determining step;
  a management information sending step that, when receiving a replay, from the adjacent node, representing management being possible, sends, to the adjacent node, the management information including the partial information based on the volume determined by the content volume determining step;
  a tag information distributing step that creates the tag information based on the part of the delivery target content managed by its own node, and sends the created tag information to another node;
  a content transfer request receiving step that receives a download request for the delivery target content; and
  a content transfer step that:
  when the download request received by the content transfer request receiving means corresponds to the delivery target content managed by its own node, accesses, in accordance with the location information, a node holding the delivery target content;
  downloads, in accordance with the partial information, the corresponding part of the delivery target content to its own node; and
  uploads the corresponding part of the delivery target content to a node that sends the download request of the delivery target content.

BRIEF DESCRIPTION OF THE DRAWINGS

FIG. 1 is a P2P network schematically indicative of a conventional content delivery method;

FIG. 2 is a P2P network schematically indicative of a conventional content delivery method;

FIG. 3 is a P2P network schematically indicative of a content delivery method according to a first embodiment of the present invention;

FIG. 4 is the P2P network schematically indicative of the content delivery method according to the first embodiment of the present invention;

FIG. 5 is a view illustrating data formats of a content and tag information to be delivered in the P2P network according to the first embodiment of the present invention;

FIG. 6 is a view illustrating a data format of node information to be used in the P2P network according to the first embodiment of the present invention;

FIG. 7 specifically illustrates an example of data formats of divided contents and their pieces of tag information obtained when one content is divided into the divided contents;

FIG. 8 is a schematic structural view of a content delivery apparatus according to the first embodiment of the present invention;

FIG. 9 is a flowchart illustrating a P2P network connection task in the content delivery apparatus (connecting node) according to the first embodiment of the present invention;

FIG. 10 is a flowchart illustrating the P2P network connection task in the content delivery apparatus (node to be connected) according to the first embodiment of the present invention;

FIG. 11 is a flowchart illustrating a content division and delivery task in the content delivery apparatus (content transmitting node) according to the first embodiment of the present invention;

FIG. 12 is a flowchart illustrating the content division and delivery task in the content delivery apparatus (content receiving node) according to the first embodiment of the present invention;

FIG. 13 is a flowchart illustrating a tag-information distribution task in the content delivery apparatus (tag-information transmitting node) according to the first embodiment of the present invention;

FIG. 14 is a flowchart illustrating the tag-information distribution task in the content delivery apparatus (tag-information receiving node) according to the first embodiment of the present invention;

FIG. 15 is a flowchart illustrating a content search and transfer task in the content delivery apparatus (content downloading node) according to the first embodiment of the present invention;

FIG. 16 is a flowchart illustrating the content search and transfer task in the content delivery apparatus (content searching node) according to the first embodiment of the present invention;

FIG. 17 is a flowchart illustrating the content search and transfer task in the content delivery apparatus (content uploading node) according to the first embodiment of the present invention;

FIG. 18 is a P2P network schematically indicative of a content delivery method according to a modification of the first embodiment of the present invention;

FIG. 19 is a P2P network schematically indicative of a content delivery method according to another modification of the first embodiment of the present invention;

FIG. 20 is a P2P network schematically representing the content delivery method according to the first embodiment of the present invention;

FIG. 21 is a P2P network schematically indicative of a content delivery method according to a second embodiment of the present invention;

FIG. 22 is the P2P network schematically indicative of the content delivery method according to the second embodiment of the present invention;

FIG. 23 is a schematic structural view of a content delivery apparatus according to the second embodiment of the present invention.

FIG. 24 is a flowchart illustrating a content division and management task in the content delivery apparatus (management-information transmitting node) according to the second embodiment of the present invention;

FIG. 25 is a flowchart illustrating the content division and management task in the content delivery apparatus (management-information receiving node) according to the second embodiment of the present invention;

FIG. 26 is a flowchart illustrating a content search and transfer task in the content delivery apparatus (content downloading node) according to the second embodiment of the present invention; and FIG. 27 is a flowchart illustrating the content search and transfer task in the content delivery apparatus (content uploading node) according to the second embodiment of the present invention.

DESCRIPTION OF CHARACTERS

| | |
|---|---|
| $\alpha, \alpha0, \alpha1, \alpha2, \alpha3, \alpha4, \alpha5, \alpha6$ | Content |
| $\beta, \beta0, \beta1, \beta2, \beta3, \beta4, \beta5, \beta6$ | Tag information |
| $\gamma$ | Node information |
| 1, 2 | Node (Content delivery apparatus) |
| 101 | Data transceiver unit |
| 102 | Node-information management unit |
| 103 | Node-information storage |
| 104, 201 | Tag-information management unit |
| 105, 202 | Tag-information storage |
| 106 | Content management unit |
| 107 | Node analyzing unit |
| 108 | Content dividing unit |
| 109 | Content storage |
| 110 | Content regenerating unit |
| 111 | Overall control unit |
| 203 | Management information generating unit |

BEST MODES FOR CARRYING OUT THE INVENTION

Embodiments of the present invention will be described hereinafter with reference to the drawings.

First Embodiment

Content Delivery Method

FIG. 3 illustrates a P2P network 10 that schematically represents a content delivery method according to a first embodiment of the present invention. Note that the P2P network 10 is a network in which:

nodes are defined, according to speeds (specifically, upstream speeds) of lines connected to the nodes, as upstream and downstream nodes (relationships between the upstream and downstream are relative relationships between nodes and another node connected to the nodes); and tag information indicative of information on files of contents or the locations of the contents are distributed so that the contents are delivered among the nodes.

One example of the P2P network is a P2P network formed by computes, as nodes, each installed with P2P file sharing software, such as Winny. In other words, the P2P network 10 is configured such that:

nodes connected to high communication networks are defined as upstream nodes;

nodes connected to low communication networks are defined as downstream nodes (note that, when upload speeds are the same, the line speeds do not always mach the relationships between the upstream and downstream, so that, more accurately, nodes for transmitting tag information are defined as downstream nodes, and nodes for receiving tag information are defined as upstream nodes); and contents and their index information are more gathered in the upstream nodes to thereby enhance the content-search efficiency or the content-delivery efficiency.

Note that the content delivery method according to this embodiment can be implemented by installing a content delivery program according to this embodiment of the present invention into each node (referred to as content delivery apparatus hereinafter).

The content delivery program according to this embodiment includes, in addition to functions provided in the Winny, a content division and delivery function of dividing public contents (delivery target contents) and delivering the divided public contents to downstream nodes.

The content delivery method according to this embodiment is a method in which content-publishing nodes divide a publish content according to the situations of downstream nodes adjacent thereto, and cause the adjacent downstream nodes to hold divided publish contents. This method causes the downstream nodes, in addition to the upstream nodes, to be responsible for a part of content-deliveries to thereby effectively use the downstream nodes.

Note that the situation of a downstream node means, for example, the speed of a line to which the downstream node is connected. A downstream node is adapted to hold, by itself, a divided content the volume of which depends on the line speed (the lower the line speed to which a downstream node is connected is, the more the volume to be held is reduced).

When downloading the content, a content searching node downloads the divided contents in parallel from a plurality of downstream nodes that hold the divided contents, thus distributing uploading loads into the plurality of downstream nodes and increasing the speed of the downloading. As described above, the content delivery method according to this embodiment is designed to transfer, to a content searching node, a divided content, the volume of which depends on a band of a communication network to which a downstream node is connected, even if the band is small. For this reason, the content delivery method can effectively use the small network band, thus effectively using downstream nodes.

Specific descriptions will be provided with reference to FIGS. 3 and 4.

For example, when a node A illustrated in FIG. 3 publishes a content $\alpha 0$, the node A sends, to each of nodes C and D downstream of the node A, a content-hold request. The content-hold request requests each of the nodes C and D to hold a volume of the content; this volume meets the situation of a corresponding one of the nodes C and D. For example, in FIG. 3, holding of ⅜ of the content $\alpha 0$ is requested for the node C, and holding of ⅝ thereof is requested for the node D. In this specific example, the content $\alpha 0$ is divided in proportional to the line speed of the node C and that of the node D.

When receiving a reply, from each of the nodes C and D, representing that content-hold request can be carried out, the node A transmits a requested volume of a divided content $\alpha 1$ to the node C, and a requested volume of a divided content $\alpha 2$ to the node D. This results in that the node C holds the divided content $\alpha 1$, creates tag information $\beta 1$ on the content $\alpha 1$ representing that the node C holds the divided content $\alpha 1$, and delivers the tag information $\beta 1$ to upstream nodes adjacent thereto. In addition, the node D holds the divided content $\alpha 2$, creates tag information 132 on the content $\alpha 2$ representing that the node D holds the divided content $\alpha 2$, and delivers the tag information $\beta 2$ to upstream nodes adjacent thereto.

Let us describe reference characters illustrated in FIG. 3. Tag information $\beta 0$ in the node A represents that the content $\alpha 0$ is present in the node A, and a whole content (an undivided content) is held. "11111111" represents bitmap information. The bitmap information represents that which of eight blocks of divided contents obtained by dividing a content into the eight blocks is held; 1 of the bitmap information represents that a corresponding block is stored, and 0 of the bitmap information represents that no blocks are stored.

The tag information $\beta 0$ represents that all of eight blocks (a whole content) are held. Similarly, the tag information $\beta 1$ represents that ⅜ (the first part) of the content $\alpha 0$ is stored in the node C, and the tag information $\beta 2$ represents that ⅝ (the latter part) of the content $\alpha 0$ is stored in the node D.

Note that a node that has received a divided content and stored it can send, to downstream nodes adjacent thereto, a content-hold request.

For example, the node D illustrated in FIG. 3 is operative to send, to downstream nodes W, X, Y, and Z downstream of the node D, a content-hold request. The content-hold request requests the node W to hold ⅛ of the content $\alpha 0$, the node X to hold ⅛ of the content $\alpha 0$, the node Y to hold ⅖ of the content $\alpha 0$, and the node Z to hold ⅛ of the content $\alpha 0$. Of course, the volume of each of the divided contents is determined depending on the situations (line speeds) of the individual nodes.

When receiving a reply, from each of the nodes W, X, Y, and Z, representing that content-hold request can be carried out, the node D transmits a corresponding requested volume of a divided content to each of the nodes W, X, Y, and Z. This results in that the node W holds a divided content $\alpha 3$, creates tag information $\beta 3$ on the content $\alpha 3$ representing that the node W holds the divided content $\alpha 3$, and delivers the tag information $\beta 3$ to upstream nodes adjacent thereto.

Similarly, the node X holds a divided content $\alpha 4$, creates tag information $\beta 4$ on the content $\alpha 4$ representing that the node X holds the divided content $\alpha 4$, and delivers the tag information $\beta 4$ to upstream nodes adjacent thereto. Moreover, the node Y holds a divided content $\alpha 5$, creates tag information $\beta 5$ on the content $\alpha 5$ representing that the node Y holds the divided content $\alpha 5$, and delivers the tag information $\beta 5$ to upstream nodes adjacent thereto. Furthermore, the node Z holds a divided content $\alpha 6$, creates tag information $\beta 6$ on the content $\alpha 6$ representing that the node Z holds the divided content $\alpha 6$, and delivers the tag information $\beta 6$ to upstream nodes adjacent thereto.

The content delivery method according to this embodiment can divide one content over a plurality of layered nodes. For this reason, the original node is subdivided to be distributedly arranged in more downstream nodes; this reduces unevenly distributed contents in the entire P2P network 10.

On the other hand, when trying to download the content $\alpha 0$, a node E illustrated in FIG. 4 sends, to an upstream node adjacent thereto, a search query for the content $\alpha 0$. Thereafter, the node E receives, from the adjacent upstream node, the pieces $\beta 1$ to $\beta 6$ of tag information each of which represents the location of a corresponding divided content.

Thus, in accordance with the pieces β1 to β6 of tag information, the node E downloads, from the nodes that store the divided contents of the content α0, the divided contents of the content α0.

In an example illustrated in FIG. 4, the node E simultaneously downloads the divided contents in parallel from the nodes C, W, X, Y, and Z, and thereafter, merges the divided contents into the one content α0. Of course, because the node E can receive the tag information β0, the node E can download an entire content α.

As described above, the content delivery method according to this embodiment simultaneously downloads a plurality of divided contents in parallel from a plurality of downstream nodes, making it possible to effectively use downstream nodes, and speed up downloads.

<Data Configuration>

FIG. 5 illustrates data formats of a content α and tag information 13 to be delivered in the P2P network 10. Note that, in this specification, when a content and tag information corresponding thereto are intended to be expressed as an entire content and tag information corresponding to the entire content, the content and tag information are represented such that 0 is assigned to them, such as a content α0 and tag information β0.

When a content and tag information corresponding thereto are intended to be expressed as a divided content and tag information corresponding to the divided content, the content and tag information are represented such that a natural number is assigned to them, such as a content α1, α2, α3, ..., αN (N is a natural number) and tag information β1, β2, ..., βN (N is a natural number).

When a content and tag information corresponding thereto are intended to mean a general content including an entire content and divided contents and general tag information including tag information corresponding to the entire content and pieces of tag information corresponding to the divided contents, the content and tag information are represented as a content α and tag information β.

Tag information β is index information indicative of the information on a content α and/or the location thereof, and corresponds uniquely to the content α.

Specifically, tag information β consists of:
a content ID for uniquely identifying a corresponding content α (a content ID of an entire content and content IDs of divided contents of the entire content are the same as each other);
bitmap information that is partial information on divided blocks (information indicative of which of blocks of divided contents);
content-related information (for example, the title, the performers, the category, thumbnail images, the time, the size, and the supplier of an encryption key of a corresponding content);
a checksum for checking whether divided contents are completely collected; and
a content-hold location that is an address of a node in which a content α corresponding to the tag information β is held (IP address, port number).

A content α consists of a content header as header information and content data as an entity of the content. The content header is made up of the content ID, the bitmap information, and the checksum.

FIG. 6 illustrates a data format of node information γ to be used in the P2P network 10. The node information γ is information required for a node to subscribe to the P2P network 10, and specifically, consists of a node ID for uniquely identifying a corresponding node, node-related information (for example, the name, the line speed, the supported languages, the region, the preferences, the registered communities, and the free storage space of a corresponding node), and a node location as an address of a corresponding node (IP address, port number).

FIG. 7 specifically illustrates data formats of divided contents and their pieces of tag information obtained when one content is divided into the divided contents. In FIG. 7, a content α0 stored in a node A (consisting of four blocks) is divided into two divided contents α1 and α2; these divided contents α1 and α2 are stored in a node S and a node T, respectively.

Tag information β1 represents that the node S holds the divided content α1 consisting of three blocks (blocks 1, 2, and 3), and the tag information β2 represents that the node S holds the divided content α2 consisting of one block (block 4).

<Configuration of Content Delivery Apparatus>

FIG. 8 is a schematic structural view of a node (content delivery apparatus) 1 in the P2P network 10. The content delivery apparatus 1 is a terminal device can transmit and/or receive data through a communication network, such as an internet network. For example, as the content delivery apparatus 1, a computer, such as a personal computer (referred to as PC) or a home information appliance, such as a DVD recorder, a DVD player, a television set, a cellular phone, or a PDA, can be used.

The content delivery apparatus 1 includes a data transceiver unit 101, a node-information management unit 102, a node-information storage 103, a tag-information management unit 104, a tag-information storage 105, a content management unit 106, a node analyzing unit 107, a content dividing unit 108, a content storage 109, a content regenerating unit 110, and an overall control unit 111.

The data transceiver unit 101 transmits and receives information to and from another node. Specifically, the data transceiver unit 101 carries out communications of contents α, tag information β, node information γ, and the like with another node.

The node-information management unit 102 manages a pieces of node information γ on another node connected to the node itself, a piece of node information γ on the node itself, and a piece of node information γ on another node unconnected to the node itself.

The node-information storage 103 stores therein the pieces of node information γ (a node information list L1) to be managed by the node-information management unit 102.

The tag information management unit 104 merges tag information β corresponding to α content α held by its own node 1 with tag information β received from downstream nodes to thereby create a tag information list L2. The tag information management unit 104 searches the tag information list L2 according to a content-search request from another node to thereby create a result of the search.

The tag-information storage 105 stores therein the tag information β (tag information list L2) to be managed by the tag information management unit 104.

The content management unit 106 manages a content a downloaded from another node, and divided contents αN to be delivered to downstream nodes.

When delivering the divided contents αN to downstream nodes, the node analyzing unit 107 receives the node information γ from each of the downstream nodes and determines a proper volume of division.

The content dividing unit 108 divides a content α at the volume of division determined by the node analyzing unit 107.

The content storage 109 stores therein the content α to be managed by the content management unit 106.

The content regenerating unit 110 regenerates contents.

The overall control unit 111 controls the data transfer to each of the element 101 to 110 according to requests from another node and request to another node.

Note that the content delivery apparatus 1 is designed as an electronic apparatus including: a CPU integrated with at least computing functions and control functions; a main storage unit consisting of a ROM and a RAM having functions of storing therein programs and data; and an external storage unit equipped with a hard disk.

Specifically, the data transceiver unit 101, the node-information management unit 102, the tag-information management unit 104, the content management unit 106, the node analyzing unit 107, the content dividing unit 108, the content regenerating unit 110, and the overall control unit 111 represent specific computing and control functions of the CPU.

The node-information storage 103, the tag-information storage 105, and the content storage 109 represent specific functions of the main storage unit and the external storage unit.

A program that executes various tasks in the content delivery apparatus 1 described hereinafter is stored beforehand in the main storage unit. The program can be stored in a computer-readable medium, such as a hard disk, a flexible disk, a CD-ROM, a DVD-ROM, or the like, or can be delivered via a communication network.

<Operations of Content Delivery Apparatus>

Next, operations of the content delivery apparatus 1 will be described hereinafter with reference to FIGS. 9 to 17.

FIGS. 9 and 10 are flowcharts each representing a P2P network connection task for connecting the content delivery apparatus 1 to the P2P network 10. FIGS. 11 and 12 are flowcharts each representing a content division and delivery task for dividing a content and delivering divided contents. FIGS. 13 and 14 are flowcharts each representing a tag-information distribution task for distributing tag information in upstream nodes. FIGS. 15 to 17 are flowcharts each representing a content search and transfer task for searching and transferring a content.

(P2P Network Connection Task)

The P2P network connection task will be described hereinafter with reference to FIGS. 9 and 10. The P2P network connection task is a task as a precondition for carrying out the content dividing and delivering task, the tag-information distributing task, and the content searching and transferring task. Note that FIG. 9 is a task in a node, referred to as a content delivery apparatus 1a for convenience in description, that tries to newly connect to the P2P network 10, and FIG. 10 is a task in a node, referred to as a content delivery apparatus 1b for convenience in description, to which the content delivery apparatus 1a tries to connect.

When trying to newly subscribe to the P2P network 10, the content delivery apparatus 1a reads the node information list L1 from the node information storage 103 (step S2), and determines whether the node information γ of another node (step S4). When the node information list L1 stores therein the node information γ on another node (step S4; YES), the content delivery apparatus 1a uses the node information γ on another node.

Otherwise, when the node information list L1 does not store therein the node information γ on another node (step S4; NO), the content delivery apparatus 1a accesses a management server (server equipped with node information for initial connection to the P2P network 10), obtains the node information γ on an initial destination node (step S6), and stores the obtained node information γ in the node-information storage 103 (step S8).

Next, the content delivery apparatus 1a references the node-related information described in the node information γ (node information list L1) stored in the node-information storage 103 to thereby select a destination node (step S10). For example, the apparatus 1a selects a destination node with the preferences that are matched with the preferences of its own node.

Subsequently, the content delivery apparatus 1a sends, to the selected destination node, a connection request (step S12), and determines whether the connection is possible based on a reply, from the destination node, to the connection request (step S14).

When the connection is possible (step S14; YES), the content delivery apparatus 1a executes a process for connection to the destination node (step S18), thereafter obtains the node information list L1 from the destination node, and adds it as new node information γ to the node-information storage 103 (step S20).

Otherwise, the connection is impossible (step S14; NO), the content delivery apparatus 1a obtains the node information list L1 from the requested node, and adds it as new node information γ to the node-information storage 103 (step S15). Thereafter, the content delivery apparatus 1a determines whether there is not node information γ effective as a destination node (step S16).

When there is not node information γ effective as a destination node (step S16; YES), the content delivery apparatus 1a returns to step S6, and when there is node information γ effective as a destination node (step S16; NO), the content delivery apparatus 1a returns to step S10 and finds a new destination node.

Next, the content delivery apparatus 1a determines whether the connected destination node is fixed (step S22). When the connected destination node is fixed (step S22; YES), the content delivery apparatus 1a terminates the P2P network connection task. Otherwise, when wanting to connect to another destination node (step S22; NO), the content delivery apparatus 1a returns to step S10, and finds another destination node.

On the other hand, when receiving the connection request (step S32; step S12 in FIG. 9), the content delivery apparatus 1b check its status of connections (step S34), and determines whether connection is possible (step S36). Note that the determination of whether connection is possible is carried out based on the maximum number of connections of one node in the P2P network, the busy state of its own node, and the like.

When it is determined that the connection is possible (step S36; YES), the content delivery apparatus 1b creates a connectable message, sends, to the content delivery apparatus 1a, it as a reply (step S38; corresponding to step S14 in FIG. 9), and executes a process for connection to the apparatus 1a (step S40; corresponding to step S18 in FIG. 9).

In contrast, when it is determined that the connection is impossible (step S36; NO), the content delivery apparatus 1b creates a disconnectable message, sends, to the content delivery apparatus 1a, it as a reply (step S42; corresponding to step S14 in FIG. 9).

Finally, the content delivery apparatus 1b sends, to the requesting node, the node information list stored in its own node (step S42).

Note that the flowchart of the P2P network connection task illustrated in FIG. 9 represents a method in which the content apparatus 1a that wants to newly subscribe to the P2P network 10 finds by itself a destination node to connect it.

Another method in which a server for pointing to a destination node, and the content apparatus 1a accesses the server to subscribe to the P2P network 10 can be used.

(Content Division and Delivery Task)

The content division and delivery task will be described hereinafter with reference to FIGS. 11 and 12. Note that FIG. 11 is a task in an upstream node for dividing a content and delivering divided contents, in other words, a content-transmitting node (referred to as a content delivery apparatus 1a for convenience in description), and FIG. 12 is a task in a downstream node for receiving a divided content, in other words, a content-receiving node (referred to as a content delivery apparatus 1b for convenience in description).

The content delivery apparatus 1a obtains latest node information γ from downstream nodes connected thereto, and updates the node information γ on destination nodes (step S52). Next, the content delivery apparatus 1a determines whether downstream nodes are present based on the updated node information list L1 (step S54). This is to compare the line speed (upload speed) of its own node with that of alternative nodes and determine whether downstream nodes are present (a node with the line speed lower than the line speed of its own node is defined as a downstream node).

When downstream nodes are present (step S54; YES), the content delivery apparatus 1a determines a volume of one divided content αN according to the line speed of each downstream node: (step S56). Then, the content delivery apparatus 1a selects one of the downstream nodes, which stores no divided contents, and sends, to the selected downstream node, a divided-content hold request (step S58).

From a replay, from the selected downstream node, to the divided-content hold request, the content delivery apparatus 1a determines whether holding of the one divided content αN is possible (step S60).

When the holding of the one divided content αN is possible (step S60; YES), the content delivery apparatus 1a transmits, to the downstream node requested to hold the one divided content αN, the determined volume of the one divided content αN (step S62).

Next, the content delivery apparatus 1a determines whether the divided-content hold request has been sent to all of the downstream nodes (step S64). When there is a downstream node to which the divided-content hold request has not been sent yet, the content delivery apparatus 1a returns to step S58, and requests it to hold an alternative one divided content αN.

On the other hand, the content delivery apparatus 1b transmits, to an upstream node connected thereto, latest node information γ stored in its own node (step S72; corresponding to step S52 in FIG. 11).

Next, the content delivery apparatus 1b receives the divided-content hold request from the upstream node connected thereto (step S74; corresponding to step S58 in FIG. 11), and determines whether its own node is in a state for holding a corresponding divided content αN (step S76). Note that the determination of whether its own node is in a state for holding the divided content αN based on the free storage space of its own node, the busy state of its own node, and the like. Note that the divided-content hold request includes the volume of a corresponding divided content αN.

Upon determining that its own node is in a state for holding a corresponding divided content αN (step S76; YES), the content delivery apparatus 1b creates a holdable message, sends it to the content delivery apparatus 1a as a reply (step S78; corresponding to step S60 in FIG. 11), and thereafter, receives a corresponding divided content αN from the content delivery apparatus 1a (step S82; corresponding to step S62 in FIG. 11).

Next, the content delivery apparatus 1b creates tag information αN corresponding to the received divided content αN, and additionally writes it into its own tag information list L2 (step S84). Note that the tag information list L2 to which the new tag information L2 is described is periodically transmitted to upstream nodes as described hereinafter.

In contrast, upon determining that its own node is not in a state for holding the divided content αN (step S76; NO), the content delivery apparatus 1b creates a hold refusing message, and sends it to the content delivery apparatus 1a as a reply (step S80; corresponding to step S60 in FIG. 11).

Note that, in the flowcharts of the content division and delivery task illustrated in FIGS. 11 and 12, an upstream mode grasps, based on the received node information γ on downstream nodes, the line speeds of the downstream nodes, but can grasp the line speeds of the downstream nodes using another method. For example, when receiving the node information γ from downstream nodes (in step S52 of FIG. 11), an upstream node can actually measure the line speeds of the downstream nodes to thereby grasp them.

(Tag-Information Distribution Task)

The tag-information distribution task will be described hereinafter with reference to FIGS. 13 and 14. Note that FIG. 13 is a task in a downstream node (referred to as a content delivery apparatus 1a for convenience in description) for delivering its tag information list L2 to an upstream node, and FIG. 14 is a task in an upstream node (referred to as a content delivery apparatus 1b for convenience in description) for receiving the tag information list L2 from downstream nodes.

The content delivery apparatus 1a periodically transmits its own tag information list L2 to an upstream node (step S92).

On the other hand, every time when periodically receiving the tag information list L2 (step S102; corresponding to step S92 in FIG. 13), the content delivery apparatus 1b reflects the received tag information list L2 on its held tag information list L2 to thereby create tag information list L2 on which the new tag information β is reflected, and stores it in the tag-information storage 105 (step S104).

Note that, in the tag-information distribution task, because the updating of the content-hold location of the tag information β is carried out at a predetermined probability, when becoming a new content-holding location, a node serves as a relay node for content distributions, and can hold published contents (delivery target contents).

(Content Search and Transfer Task)

The content search and transfer task will be described hereinafter with reference to FIGS. 15 to 17. Note that FIG. 15 is a task in a node for sending a content-search request and downloading a desired content (referred to as a content delivery apparatus 1a for convenience in description). FIG. 16 is a task in a node for searching contents (referred to as a content delivery apparatus 1b for convenience in description). FIG. 17 is a task in a node that publishes and holds the desired content and for uploading the desired content (referred to as a content delivery apparatus is for convenience in description).

The content delivery apparatus 1a sends, to each upstream node adjacent thereto, a content-search request in step S112, and determines whether there is a search-requested content α based on a reply, from each upstream node, to the content-search request (step S114). This is to determine whether tag information β on the search-requested content a (tag information β with the content ID identical to the content ID of the search-requested content α) is received by the apparatus 1a.

When there is a search-requested content α, the content delivery apparatus 1a selects any one of received pieces of tag information β, accesses a node described in the selected piece of tag information β to send, to it, a content-download request (step S116), and determines whether the downloading is possible based on a reply, from the accessed node, to the content-download request (step S118).

When the downloading of the content α is possible, the content delivery apparatus 1a carries out a process of downloading the content a (step S120). This allows the desired content α (entire content or divided content) to be downloaded from the accessed node.

Next, the content delivery apparatus 1a determines whether the request for alternative nodes to execute the downloading is possible based on the replies to the content-search request (step S122).

When the request for an alternative node to execute the downloading is possible (step S122; YES), the content delivery apparatus 1a returns to step S116 to request the alternative node to download the content α. This is carried out in cases where pieces of tag information β are received, and a node described in each piece of tag information β holds a corresponding divided content αN for the same content.

Otherwise, the request for alternative nodes to execute the downloading is impossible (step S122; NO), the content delivery apparatus 1a merges divided contents αN that have been parallely downloaded into an original content α0 (step S104). Of course, when an entire content α0 is downloaded, there is no need to merge it.

On the other hand, when receiving the content-search request from the content delivery apparatus 1a (step S132; corresponding to step S112 in FIG. 15), the content delivery apparatus 1b searches tag information list L2 stored in its own tag information storage 105 for the search-requested content α, and sends, to the content delivery apparatus 1a, found tag information β (step S134; corresponding to step S114 in FIG. 15). Note that, when the search-requested content α is not found in its own tag information list L2, the content delivery apparatus 1a sends, to more upstream nodes, the content-search request, and allows a result of the search to be returned from each of the more upstream nodes. The upper limit of upstream nodes to which the content-search request should be transmitted can be defined as a hop count contained in the content-search request, or defined as specifications of the P2P network 10.

On the other hand, when receiving the content-download request from the content delivery apparatus 1a (step S142; corresponding to step S116 in FIG. 15), the content delivery apparatus 1c determines whether its own node is in a state for uploading the content α (step S144). Note that the determination of whether its own node is in a state for uploading the content α based on the busy state of its own node, the presence or absence of the content α, and the like.

Upon determining that its own node is in a state for uploading the requested content α, the content delivery apparatus 1c creates a transferable message, sends it to the content delivery apparatus 1a as a reply (step S146; corresponding to step S118 in FIG. 15), and thereafter, executes a process to upload the content α (step S148; corresponding to step S120 in FIG. 15).

This allows the desired content α (an entire content or a divided content) to be uploaded from the content delivery apparatus 1b to the content delivery apparatus 1a.

In contrast, upon determining that its own node is not in a state for uploading the requested content α, the content delivery apparatus 1c creates an untransferable message, and sends it to the content delivery apparatus 1a as a reply (step S150; corresponding to step S118 in FIG. 15).

As described above, according to this embodiment, in a P2P network in which:
- nodes are defined, according to line speeds connected to the nodes, as upstream and downstream nodes; and
- tag information indicative of information on files of contents or the locations of the contents are distributed so that the contents are delivered among the nodes,
- each of the downstream nodes holds a divided content that meets its situation of a corresponding node in addition to the upstream nodes.

For this reason, it is possible to effectively use a network band of a downstream node to download a content. This reduces a burden on the upstream nodes, thus making the entire P2P network efficient. In addition, divided contents can be downloaded in parallel from a plurality of nodes, and therefore, it is possible to speed up the downloading.

Conventionally, the network band of downstream nodes may be a bottleneck in content deliveries so that it is not factored in content deliveries. However, this allows the network band of the downstream nodes to be effectively used.

Note that, in this embodiment, because divided contents are handled, a node for division and delivery of contents can reduce a time required to delivery a content, and a node for upload of contents can reduce its uploading load.

More many downstream nodes hold part of popular contents, and therefore, the number of nodes that can simultaneously download divided contents of a popular content is increased, thus permitting more effective deliveries.

The first embodiment has been described, and various modifications can be applied to the content delivery method according to the first embodiment.

For example, in the content division and delivery task of the content delivery method according to this embodiment, a content transmitting node is configured to hold a content as a target of division (non-divided content) in itself, but can be configured to delete the non-divided content) after transferring a divided content to a content receiving node.

FIG. 18 illustrates a P2P network 10A schematically representing such a content delivery method. For example, when a node A divides its own held content α0 into divided contents, and delivers them to downstream nodes C and D adjacent thereto, respectively, the node A can delete the content α0 after delivering the divided contents to the nodes C and D.

Moreover, when a node D divides its own held content α2 into divided contents, and delivers them to downstream nodes W, X, Y, and Z adjacent thereto, respectively, the node D can delete the content α2 after delivering the divided contents to the nodes W, X, Y, and Z.

As a result, it is possible to further reduce a load of the storage capacity of the upstream nodes.

In addition, as illustrated in FIG. 19, in the content division and delivery task of the content delivery method according to this embodiment, it is possible to divide a content for downstream nodes adjacent thereto in addition to its own node.

For example, when node A divides its own held content α0 into divided contents, and delivers them to downstream nodes C and D adjacent thereto, the node A can divide the content α0 into divided contents for the respective nodes A, C, and D. Moreover, when node D divides its own held content α2 into divided contents and delivers them to downstream nodes W, X, Y, and Z, the node D can divide the content α2 into divided contents for the respective nodes D, W, X, Y, and Z.

Second Embodiment

Content Delivery Method

A content delivery method according to a second embodiment of the present invention will be described.

The content delivery method according to this embodiment, which is different from the content delivery method according to the first embodiment, does not deliver divided contents to downstream nodes, and downstream nodes do not hold divided contents. Specifically, in this embodiment, each node does not hold divided contents themselves, but only holds management information associated with the divided contents.

Note that management information associated with a divided content includes partial information of the divided content managed by its own node (information indicative of which block in an entire content being managed), and location information indicative of a location at which a content itself is actually presented (an address of a content holding node in which the divided content managed by its own node is actually presented). Other points of the content delivery method according to the second embodiment are substantially identical to those of the content delivery method according to the first embodiment. Note that, in this embodiment, elements and operations different from the first embodiment are only described, and other elements and operations are omitted in description with the same reference characters attached to the same portions.

FIGS. 20 to 23 illustrates a P2P network 20 that schematically represents the content delivery method according to this embodiment of the present invention. Note that, like the P2P network 10, the P2P network 10 is a network in which:

nodes are defined, according to speeds (specifically, upstream speeds) of lines connected to the nodes, as upstream and downstream nodes (relationships between the upstream and downstream are relative relationships between nodes and another node connected to the nodes; and tag information indicative of information on files of contents or the locations of the contents are distributed so that the contents are delivered among the nodes.

One example of the P2P network is a P2P network formed by computes, as nodes, each installed with P2P file sharing software, such as Winny. In other words, the P2P network 20 is configured such that:

nodes connected to high communication networks are defined as upstream nodes;

nodes connected to low communication networks are defined as downstream nodes (note that, when upload speeds are the same, the line speeds do not always mach the relationships between the upstream and downstream, so that, more accurately, nodes for transmitting tag information are defined as downstream nodes, and nodes for receiving tag information are defined as upstream nodes); and contents and their index information are more gathered in the upstream nodes to thereby enhance the content-search efficiency or the content-delivery efficiency.

Note that the content delivery method according to this embodiment can be implemented by installing a content delivery program according to this embodiment of the present invention into each node (referred to as content delivery apparatus hereinafter).

In addition to functions provided in the Winny, the content delivery program according to this embodiment includes:

a content division and delivery function of dividing public contents (delivery target contents) and delivering the divided public contents to downstream nodes; and a tag-information merge and delivery function of merging divided published pieces of tag information with each other to deliver it.

The content delivery method according to this embodiment is a method in which, in response to update of tag-information or the like, a node having updated tag information divides management information of a publish content (content described in the tag information) according to the situations of downstream nodes adjacent thereto, and causes the adjacent downstream nodes to hold divided pieces of the management information. This method causes the downstream nodes, in addition to the upstream nodes, to be responsible for a part of content-deliveries to thereby effectively use the downstream nodes.

Note that the situation of a downstream node means, for example, the speed of a line to which the downstream node is connected. A downstream node is adapted to hold, by itself, a divided content the volume of which depends on the line speed (the lower the line speed to which a downstream node is connected is, the more the volume to be held is reduced).

When a download request is sent to a node that holds the management information of a divided content downloads, from a node actually holding a content, it to itself, and uploads it to a content search node, Specifically, when downloading the content, the content searching node carries out downloads from a plurality of downstream nodes that manage the divided contents, thus increasing the speed of the downloading. As described above, the content delivery method according to this embodiment is designed to transfer, to a content searching node, a divided content, the volume of which depends on a band of a communication network to which a downstream node is connected, even if the band is small. For this reason, the content delivery method can effectively use the small network band, thus effectively using downstream nodes.

In addition, in this embodiment, only after a download request is created from a content search node to a node that holds the management information of a divided content, which will be referred to as "divided-content management node", the divided content is arranged on the divided-content management node. For this reason, only popular contents (contents for which download requests are created) are widely arranged on the P2P network 20.

Specific descriptions will be provided with reference to FIGS. 20 to 22.

For example, a node S illustrated in FIG. 20 publishes a content $\alpha 0$, and tag information $\beta 0$ of the content $\alpha 0$, which represents that the node S holds the content $\alpha 0$, is distributed over upstream nodes of the P2P network 20. A content division and management task is also illustrated when the tag information $\beta 0$ is updated in a node A to tag information $\beta 0a$ representing that the node A holds the content $\alpha 0$. At that time, the node A does not hold the content $\alpha 0$ itself, but holds information (location information) associated with the node S actually holding the content $\alpha 0$ in addition to the tag information $\beta 0a$. In this embodiment, the location information is internally managed as tag information $\beta 0b$ (tag information that is not distributed by the tag-information distribution task) representing that the node S holds content $\alpha 0$. Of course, the location information can be held in a data format except for tag information.

First, the node A sends, to each of nodes C and D downstream of the node A, a content-management request. The content-management request requests each of the nodes C and D to management a volume of the content; this volume meets the situation of a corresponding one of the nodes C and D. For example, in FIG. 20, holding of ⅜ of the content α0 is requested for the node C, and holding of ⅝ thereof is requested for the node D. In this specific example, the content α0 is divided in proportional to the line speed of the node C and that of the node D.

When receiving a reply, from each of the nodes C and D, representing that content-management request can be carried out, the node A transmits management information of a requested volume of a divided content α1 (specifically, partial information indicative of holding ⅜ of the content α0 and location information associated with a node that holds the content α0 itself) to the node C. The node A also transmits management information of a requested volume of a divided content α2 (specifically, partial information indicative of holding ⅝ of the content α0 and location information associated with a node that holds the content α0 itself) to the node D.

This results in that the node C holds the management information of the divided content α1, creates tag information β1 on the content α1 representing that the node C holds the divided content α1 (but actually does not hold the content α1), and delivers the tag information β1 to upstream nodes adjacent thereto. In addition, the node D holds the management information of the divided content α2, creates tag information β2 on the content α2 representing that the node D holds the divided content α2 (but actually does not hold the content α1), and delivers the tag information 132 to upstream nodes adjacent thereto.

Note that a node that has received management information of a divided content and stored it can send, to downstream nodes adjacent thereto, a content-management request.

For example, the node D illustrated in FIG. 20 is operative to send, to downstream nodes W, X, Y, and Z downstream of the node D, a content-management request. The content-management request requests the node W to manage ⅛ volume of the content α0, the node X to manage ⅛ volume of the content α0, the node Y to manage ⅖ volume of the content α0, and the node Z to manage ⅛ volume of the content α0. Of course, the volume of each of the divided contents is determined depending on the situations (line speeds) of the individual nodes.

When receiving a reply, from each of the nodes W, X, Y, and Z, representing that content-management request can be carried out, the node D transmits management information of a corresponding requested volume of a divided content to each of the nodes W, X, Y, and Z.

This results in that the node W holds the management information of a divided content α3, creates tag information β3 on the content α3 representing that the node W holds the divided content α3 (but does not actually hold the content α3), and delivers the tag information β3 to upstream nodes adjacent thereto.

Similarly, the node X holds the management information of a divided content α4, creates tag information β4 on the content α4 representing that the node X holds the divided content α4 (but actually does not hold the content α4), and delivers the tag information β4 to upstream nodes adjacent thereto.

The node Y holds the management information of a divided content α5, creates tag information β5 on the content α5 representing that the node Y holds the divided content α5 (but does not actually hold the content α5), and delivers the tag information β5 to upstream nodes adjacent thereto.

The node Z holds the management information of a divided content α6, creates tag information β6 on the content α6 representing that the node Z holds the divided content α6 (but does not actually hold the content α6), and delivers the tag information β6 to upstream nodes adjacent thereto.

As described above, the content delivery method according to this embodiment carries out the content division and management task over many layered nodes. This departmentalizes management information of an original content so that pieces of management information are arranged to be distributed over more downstream nodes. Thus, the tag information β is distributedly arranged over downstream nodes in addition to the upstream nodes.

FIGS. 21 and 22 represent a content search and transfer task when a node E downloads the content α0. Specifically, FIG. 21 illustrates a situation in which the node E transmits each of nodes C, W, X, Y, and X a download request (content transfer request). FIG. 22 illustrates a situation in which the node E downloads divided contents from the nodes C, W, X, Y, and Z. Note that, in FIGS. 21 and 22, the tag information β0b being internally controlled is omitted in illustration.

When trying to download the content α0, the node E sends, to an upstream node adjacent thereto, a search query for the content α0. Thereafter, the node E receives, from the adjacent upstream node, the pieces β1 to β6 of tag information each of which represents the location of a corresponding divided content of the content α0.

Thus, in accordance with the pieces β0 to β6 of tag information, the node E sends, to each of the nodes C, W, X, Y, and Z, a download request.

As illustrated in FIG. 22, when receiving the download request, each of the nodes C, W, X, Y, and Z does not hold a corresponding divided content αN that is download requested. Then, each of the nodes C, W, X, Y, and Z accesses a node S that actually holds the content α0 in accordance with the tag information β0 internally managed in itself, and downloads, to itself, a volume of a divided content αN; this volume corresponds to the partial information managed by itself. Each of the nodes C, W, X, Y, and Z also uploads the corresponding downloaded divided content αN to the node E. In FIG. 22, the node E concurrently downloads the divided contents αN of the content α0 from the nodes C, W, X, Y, and Z, and thereafter, merges the divided contents αN to thereby reconstruct the content α0.

As described above, the content delivery method according to this embodiment simultaneously downloads a plurality of divided contents in parallel from a plurality of downstream nodes, making it possible to effectively use downstream nodes, speed up downloads, and distribute uploading loads into the plurality of downstream nodes.

In addition, because contents themselves that are unrequested to download are not unnecessarily arranged in the P2P network 20, it is possible to reduce loads of each node.

Data Configuration>

The data formats of a content α and tag information β to be distributed in the P2P network 20 are the same as those described in the first embodiment, and the data format of node information γ to be used in the P2P network 20 is the same as that described in the first embodiment. Thus, the data formats of a content α, tag information β, and node information γ are omitted in description.

<Configuration of Content Delivery Apparatus>

FIG. 23 is a schematic structural view of a node (content delivery apparatus) 2 in the P2P network 20. As well as the content delivery apparatus 1, the content delivery apparatus 2 is a terminal device can transmit and/or receive data through a communication network, such as an internet network. For example, as the content delivery apparatus 1, a computer, such as a personal computer (referred to as PC) or a home information appliance, such as a DVD recorder, a DVD player, a television set, a cellular phone, or a PDA, can be used.

The content delivery apparatus 2 includes the data transceiver unit 101, the node-information management unit 102, the node-information storage 103, a tag-information management unit 201, a tag-information storage 202, the content management unit 106, the node analyzing unit 107, a management information generating unit 203, the content dividing unit 108, the content storage 109, the content regenerating unit 110, and the overall control unit 111.

The tag information management unit 201 merges tag information β corresponding to a content α and held by its own node 1 (there are cases where the node 1 does not actually hold the tag information β) with received pieces of tag information β from downstream nodes to thereby create a tag information list L2, and periodically distribute the information list L2 to upstream nodes. In addition, the tag information management unit 201 searches the tag information list L2 to thereby create a result of the search, and creates an internally-managed tag information list L3. The tag information list L3 is not distributed on the P2P network 20.

Specifically, in the management information, the partial information of divided contents is managed as the tag information list L2, and the location information indicative of a location at which a content itself is actually presented is managed as the tag information list L3.

The tag-information storage 203 stores therein the pieces of tag information β (tag information list L2 and internally-managed tag information list L3) to be managed by the tag information management unit 201.

The management information generating unit 203 generates the management information (the partial information of divided contents and the location information indicative of a location at which a content itself is actually presented) based on the volume of division determined by the node analyzing unit 107.

Note that the content delivery apparatus 2 is designed as an electronic apparatus including: a CPU integrated with at least computing functions and control functions; a main storage unit consisting of a ROM and a RAM having functions of storing therein programs and data; and an external storage unit equipped with a hard disk.

Specifically, the data transceiver unit 101, the node-information management unit 102, the tag-information management unit 201, the content management unit 106, the node analyzing unit 107, the management information generating unit 203, the content dividing unit 108, the content regenerating unit 110, and the overall control unit 111 represent specific computing and control functions of the CPU.

The node-information storage 103, the tag-information storage 203, and the content storage 109 represent specific functions of the main storage unit and the external storage unit.

A program that executes various tasks in the content delivery apparatus 1 described hereinafter is stored beforehand in the main storage unit. The program can be stored in a computer-readable medium, such as a hard disk, a flexible disk, a CD-ROM, a DVD-ROM, or the like, or can be delivered via a communication network.

<Operations of Content Delivery Apparatus>

Next, operations of the content delivery apparatus 2 will be described hereinafter with reference to FIGS. 24 to 27.

FIGS. 24 and 25 are flowcharts each representing a content division and management task for dividing a content and managing divided contents. FIGS. 26 and 27 are flowcharts each representing a content search and transfer task for searching and transferring a content. Note that, because the P2P network connection task and the tag-information distribution task are the same as those described in the first embodiment, they are omitted in description.

(Content Division and Management Task)

The content division management task will be described hereinafter with reference to FIGS. 24 and 25. Note that FIG. 24 is a task in a upstream node (referred to as a content delivery apparatus 2a for convenience in description) for sending divided-content management requests, in other words, a task in a management-information sending node. FIG. 25 is a task in a downstream node (referred to as a content delivery apparatus 2b for convenience in description) for receiving a divided-content management request, in other words, a task in a management-information receiving node.

The content delivery apparatus 2a obtains latest node information γ from downstream nodes connected thereto, and updates the node information γ on destination nodes (step S202).

Next, the content delivery apparatus 2a determines whether downstream nodes are present based on the updated node information list L1 (step S204). This is to compare the line speed (upload speed) of its own node with that of alternative nodes and determine whether downstream nodes are present (a node with the line speed lower than the line speed of its own node is defined as a downstream node).

When downstream nodes are present (step S204; YES), the content delivery apparatus 2a determines a volume of one divided content αN according to the line speed of each downstream node (step S206). Then, the content delivery apparatus 2a selects one of the downstream nodes, to which management request have not been sent yet, and sends, to the selected downstream node, a divided-content management request (step S208).

From a replay, from the selected downstream node, to the divided-content management request, the content delivery apparatus 2a determines whether management of the one divided content αN is possible (step S210).

When the management of the one divided content αN is possible (step S210; YES), the content delivery apparatus 2a transmits, to the downstream node requested to manage the one divided content αN, the management information based on the determined volume of the one divided content αN, that is, the address of the content holding node and the partial information of the one divided content (step S212).

Next, the content delivery apparatus 2a determines whether the divided-content management request has been sent to all of the downstream nodes (step S214). When there is a downstream node to which the divided-content management request has not been sent yet, the content delivery apparatus 2a returns to step S208, and requests it to manage an alternative one divided content αN.

On the other hand, the content delivery apparatus 2b transmits, to an upstream node connected thereto, latest node information γ stored in its own node (step S222; corresponding to step S202 in FIG. 24).

Next, the content delivery apparatus 2b receives the divided-content management request from the upstream node connected thereto (step S224 corresponding to step S208 in FIG. 24), and determines whether its own node is in a state for managing a corresponding divided content αN (step S226). Note that the determination of whether its own node is in a state for holding the divided content αN based on the free storage space of its own node, the busy state of its own node, and the like. Note that the divided-content management request includes the volume of a corresponding divided content αN.

Upon determining that its own node is in a state for managing a corresponding divided content αN (step S226; YES), the content delivery apparatus 2b creates a manageable message, sends it to the content delivery apparatus 2a as a reply (step S228; corresponding to step S210 in FIG. 24), and thereafter, receives a corresponding divided content αN from the content delivery apparatus 2a (step S232; corresponding to step S212 in FIG. 24).

Next, the content delivery apparatus 2b creates tag information βN corresponding to the received divided content αN, and additionally writes it into its own tag information list L2 (step S234). Note that the tag information list L2 to which the new tag information L2 is described is periodically transmitted to upstream nodes.

In contrast, upon determining that its own node is not in a state for holding the divided content αN (step S226; NO), the content delivery apparatus 2b creates a management refusing message, and sends it to the content delivery apparatus 2a as a reply (step S230; corresponding to step S210 in FIG. 24).

Note that, in the flowcharts of the content division and management task illustrated in FIGS. 24 and 25, an upstream mode grasps, based on the received node information γ on downstream nodes, the line speeds of the downstream nodes, but can grasp the line speeds of the downstream nodes using another method. For example, when receiving the node information γ from downstream nodes (in step S202 of FIG. 24), an upstream node can actually measure the line speeds of the downstream nodes to thereby grasp them.

(Content Search and Transfer Task)

The content search and transfer task will be described hereinafter with reference to FIGS. 26 and 27. Note that FIG. 26 is a flowchart of a task in a node for uploading a content that is requested to search (referred to as a content delivery apparatus 2c for convenience in description). FIG. 27 is a flowchart of a content uploading process in step S248 of FIG. 26. Note that a task in a node for sending a content-search request and downloading a desired content (referred to as a content delivery apparatus 2a for convenience in description) and a task in a node for searching contents (referred to as a content delivery apparatus 2b for convenience in description) are the same as those described in the first embodiment, and therefore, the descriptions of which are omitted.

When receiving a content-search request from the content delivery apparatus 2a (step S242), the content delivery apparatus 2c determines whether its own node is in a state for uploading the content α (step S244). Note that the determination of whether its own node is in a state for uploading the content α based on the busy state of its own node, the presence or absence of the content α, and the like.

Upon determining that its own node is in a state for uploading the requested content α, the content delivery apparatus 2c executes a process to upload the content α (step S246).

In contrast, upon determining that its own node is not in a state for uploading the requested content α, the content delivery apparatus 2c creates an untransferable message, and sends it to the content delivery apparatus 2a as a reply (step S248). Let us describe the content uploading process in step S246 with reference to FIG. 27.

The content delivery apparatus 2c determines whether its own node holds the requested content α itself (step S252). Upon holding the content α itself (step S252; YES), the content delivery apparatus 2c creates a transferrable message, and sends, to the content delivery apparatus 1a, as a reply (step 254), and executes a process for uploading the content α (step S262).

In contrast, when it is determined that the content α itself is not held (step S252; NO), the content delivery apparatus 2c determines whether its owe node knows the address of a node that holds the content α in step S256. Upon determining that its owe node has known the address of a node that holds the content α (step S256; YES), the content delivery apparatus 2c creates a transferrable message, and sends, to the content delivery apparatus 2a, as a reply (step 258), and downloads the content α from the content holding node (step S60). Subsequently, the content delivery apparatus 2c executes a process for uploading the content α to the content delivery apparatus 2a (step S62). This allows the desired content α to be transferred from the content delivery apparatus 2c to the content delivery apparatus 2a. On the other hand, when it is determined that its owe node has not known the address of the node that holds the content α yet (step S256; NO), the content delivery apparatus 2c creates a untransferable message, and sends it to the content delivery apparatus 2a as a reply As described above, this embodiment can achieve the same advantages as those of the first embodiment without causing downstream nodes to hold divided contents themselves. Specifically, in a P2P network in which:

nodes are defined, according to line speeds connected to the nodes, as upstream and downstream nodes; and tag information indicative of information on files of contents or the locations of the contents are distributed so that the contents are delivered among the nodes, the downstream nodes, in addition to the upstream nodes, manage divided contents according to the situation of its own node.

For this reason, it is possible to effectively use a network band of a downstream node to download a content. This reduces a burden on the upstream nodes, thus making the entire P2P network efficient. In addition, divided contents can be downloaded in parallel from a plurality of nodes, and therefore, it is possible to speed up the downloading.

In addition, this embodiments distributes pieces of management information of divided contents in the P2P network, and a divided content itself is distributed in the P2P network only after a download request for the divided content is created. Thus, only required contents can be distributed in the P2P network.

Note that, in the content delivery method according to this embodiment, the management information associated with divided contents are generated such that there are no overlaps of divided contents, but they can be generated such that there are some overlaps of divided contents. In addition, according to the situation of a downstream node (for example, the downstream node is equipped with a large capacity storage and the speed of a line connected thereto is high), it is possible to send, to the downstream node, the management information itself held in an upstream node without dividing it.

In this embodiment, an upstream node determines the volume of contents to be managed by a downstream node, but a downstream node can determines the volume of contents to be managed by itself, and an upstream node can send, to the downstream node, the management information based on the determination.

In the embodiments and their modifications, the line speed (network band) to which a downstream node is connected is considered as the situation of the downstream node, but the situation of a downstream node in the content division and delivery task is not limited thereto.

For example, the free storage space, and the processing capacity and the busy state of a node can be additionally considered.

Furthermore, a server with a backup function of including publish contents can be provided in addition to each node, which is different from pure P2P networks. If content deliveries between contents were not functioned due to any accident, contents can be downloaded from the server. This can more enhance the stability of the content delivery methods according to the embodiments.

The embodiments of the present invention have been described, and they can be subjected to various deformations and modifications within the scope of the present invention. The embodiments with such deformations and modifications are also included within the scope of the present invention.

The invention claimed is:

1. A system comprising:
a content delivery apparatus constituting each of a plurality of nodes of a P2P network, the P2P network configured to:
distribute tag information including information of a content, a location of a node in the plurality of nodes that holds the content, and partial information indicative of which parts of the content is held;
search the tag information to find a desired content; and
deliver contents among the plurality of nodes,
a management of a node in the plurality of nodes at least holding management information, the management information including:
location information indicative of a location at which a delivery target content is presented; and
the partial information of the delivery target content, the content delivery apparatus of each of the plurality of nodes comprising:
an adjacent node situation obtaining unit that obtains information of a situation of a node in the plurality of nodes adjacent to its own node;
a content volume determining unit that determines, based on the information of the situation of the adjacent node from the delivery target content managed by its own node, a volume of a part of the delivery target content that the adjacent node is requested to manage;
a content management request unit that requests the adjacent node to manage the part of the delivery target content determined by the content volume determining unit;
a management information sending unit that, when receiving a reply, from the adjacent node, representing management being possible, sends, to the adjacent node, the management information including the partial information based on the volume determined by the content volume determining unit;
a tag information distributing unit that creates the tag information based on a part of a content managed by its own node, and sends the created tag information to another node in the plurality of nodes;
a content transfer request receiving unit that receives a download request for the delivery target content; and
a content transfer unit that:
when the download request received by the content transfer request receiving unit corresponds to the delivery target content managed by its own node, accesses, in accordance with the location information, a node in the plurality of nodes holding the delivery target content;
downloads, in accordance with the partial information, the corresponding part of the delivery target content to its own node; and
uploads the corresponding part of the delivery target content to a node that sends the download request of the delivery target content;
wherein the content delivery apparatus of each of the plurality of nodes comprises:
a first storage in which node information associated with one or more nodes in the plurality of nodes except for its own node is stored, the one or more nodes being managed by the content delivery apparatus manages of its own node, the node information associated with the one or more nodes including information required for the one or more nodes to subscribe to the P2P network; and
a second storage in which the tag information of at least one content managed by the content delivery apparatus manages of its own node is stored,
wherein the adjacent node situation obtaining unit obtains the information of the situation of the adjacent node from the first storage when the node information associated with the adjacent node is stored in the first storage, and the tag information distributing unit stores the created tag information in the second storage.

2. The content delivery apparatus according to claim 1, further comprising:
a management information receiving unit that receives the management information from at least one of: the adjacent node and another adjacent node,
the tag information distributing unit creates the tag information based on the partial information of the received management information, and sends the created tag information to another node in the plurality of nodes.

3. The content delivery apparatus according to claim 1, further comprising:
a content receiving unit that parallely downloads a plurality of contents of the delivery target content from a group of nodes in the plurality of nodes; and
a merging unit that merges the downloaded plurality of contents of delivery target content into each other to reconstruct the delivery target content.

4. The content delivery apparatus according to claim 1, wherein the information of the situation of the node adjacent to its own node includes information associated with a line speed of a communication network to which its own node and the adjacent node are connected, and the content volume determining unit determines the volume of the delivery target content that is requested to manage according to the information of the line speed.

5. A content delivery method in a P2P network including a plurality of nodes, the P2P network configured to:
distribute tag information including information of a content, a location of a node in the plurality of nodes that holds the content, and partial information indicative of which parts of the content is held;
search the tag information to find a desired content; and
deliver contents among the plurality of nodes,
a management of a node in the plurality of nodes at least holding management information, the management information including:
location information indicative of a location at which a delivery target content is presented; and
the partial information of the delivery target content,
the method comprising:
obtaining an adjacent node situation by obtaining information of a situation of a node in the plurality of nodes adjacent to its own node;
determining, based on the information of the situation of the adjacent node from the delivery target content managed by its own node, a volume of a part of the delivery target content that the adjacent node is requested to manage;
requesting content management by requesting the adjacent node to manage the part of the delivery target content;
sending a management information by, when receiving a reply, from the adjacent node, representing management being possible, sending, to the adjacent node, the management information including the partial information based on the determined volume;

distributing tag information by creating the tag information based on a part a content managed by its own node, and sending the created tag information to another node in the plurality of nodes;

receiving a content transfer request by receiving a download request for the delivery target content; and performing a content transfer that:
when the received download request corresponds to the delivery target content managed by its own node, accesses, in accordance with the location information, a node in the plurality of nodes holding the delivery target content;
downloads, in accordance with the partial information, the corresponding part of the delivery target content to its own node; and
uploads the corresponding part of the delivery target content to a node that sends the download request of the delivery target content;

wherein each of the plurality of nodes comprises:
a first storage in which node information associated with one or more nodes in the plurality of nodes except for its own node is stored, the one or more nodes being managed by the content delivery apparatus manages of its own node, the node information associated with the one or more nodes including information required for the one or more nodes to subscribe to the P2P network; and
a second storage in which the tag information of at least one content managed by the content delivery apparatus manages of its own node is stored, wherein said obtaining the adjacent node situation includes obtaining the information of the situation of the adjacent node from the first storage when the node information associated with the adjacent node is stored in the first storage, and said distributing tag information includes storing the created tag information in the second storage.

6. A content delivery program product in a P2P network including a plurality of nodes configured to:
distribute tag information including information of a content, a location of a node in the plurality of nodes that holds the content, and partial information indicative of which parts of the content is held;
search the tag information to find a desired content; and
deliver contents among the plurality of nodes,
a management of a node in the plurality of nodes at least holding management information, the management information including:
location information indicative of a location at which a delivery target content is presented; and
the partial information of the delivery target content, the program product comprising:

a non-transitory computer-readable medium storing instructions forming a computer program, which upon execution by a computer in each of the plurality of nodes causes the computer to:
obtain information of a situation of a node in the plurality of nodes adjacent to its own node;
determine, based on the information of the situation of the adjacent node from the delivery target content managed by its own node, a volume of a part of the delivery target content that the adjacent node is requested to manage;
request the adjacent node to manage the part of the delivery target content determined by the computer;
when reply from the adjacent node representing management being possible is received by the computer, send, to the adjacent node, the management information including the partial information based on the volume determined by the computer;
create the tag information based on a part of a content managed by its own node, and sends the created tag information to another node in the plurality of nodes;
receive a download request for the delivery target content; and
when the download request received by the computer corresponds to the delivery target content managed by its own node, access, in accordance with the location information, a node in the plurality of nodes holding the delivery target content;
download, in accordance with the partial information, the corresponding part of the delivery target content to its own node; and
upload the corresponding part of the delivery target content to a node that sends the download request of the delivery target content;

wherein each of the plurality of nodes comprises:
a first storage in which node information associated with one or more nodes in the plurality of nodes except for its own node is stored, the one or more nodes being managed by the content delivery apparatus manages of its own node, the node information associated with the one or more nodes including information required for the one or more nodes to subscribe to the P2P network; and
a second storage in which the tag information of at least one content managed by the content delivery apparatus manages of its own node is stored, wherein an instruction which causes the computer to obtain the information of the situation of the node causes the computer to obtain the information of the situation of the adjacent node from the first storage when the node information associated with the adjacent node is stored in the first storage, and an instruction which causes the computer to create the tag information causes the computer to store the created tag information in the second storage.

* * * * *